(12) United States Patent
Su et al.

(10) Patent No.: US 12,317,194 B2
(45) Date of Patent: May 27, 2025

(54) POWER HEADROOM REPORT, CONFIGURING, POWER CONTROL, AND DATA TRANSMISSION METHOD, APPARATUS, TERMINAL, AND BASE STATION

(71) Applicant: Samsung Electronics Co., Ltd., Suwon-si (KR)

(72) Inventors: Di Su, Beijing (CN); Chuang Zhang, Beijing (CN); Peng Lin, Beijing (CN); Chen Qian, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 505 days.

(21) Appl. No.: 17/439,537

(22) PCT Filed: Mar. 20, 2020

(86) PCT No.: PCT/KR2020/003894
§ 371 (c)(1),
(2) Date: Sep. 15, 2021

(87) PCT Pub. No.: WO2020/190098
PCT Pub. Date: Sep. 24, 2020

(65) Prior Publication Data
US 2022/0159580 A1 May 19, 2022

(30) Foreign Application Priority Data

Mar. 21, 2019 (CN) .......................... 201910215914.2
Apr. 16, 2019 (CN) .......................... 201910303235.0
Apr. 18, 2019 (CN) .......................... 201910312520.9

(51) Int. Cl.
H04W 52/14 (2009.01)
H04W 52/24 (2009.01)
(Continued)

(52) U.S. Cl.
CPC ....... *H04W 52/146* (2013.01); *H04W 52/243* (2013.01); *H04W 52/365* (2013.01);
(Continued)

(58) Field of Classification Search
CPC ............. H04W 52/146; H04W 52/243; H04W 52/365; H04W 52/367; H04W 72/0446;
(Continued)

(56) References Cited

U.S. PATENT DOCUMENTS

2014/0204807 A1 7/2014 Li et al.
2016/0338107 A1 11/2016 Zeng et al.
(Continued)

FOREIGN PATENT DOCUMENTS

CN 108632837 A * 10/2018 ............ H04W 16/28
EP 2 721 886 A1 4/2014
(Continued)

OTHER PUBLICATIONS

Ericsson, Frame structure and DMRS positions, 3GPP TSG-RAN WG1 #87, R1-1612329, Nov. 13, 2016, Reno, USA.
(Continued)

*Primary Examiner* — Dinh Nguyen
(74) *Attorney, Agent, or Firm* — Jefferson IP Law, LLP

(57) ABSTRACT

There is provided a power headroom report method, a configuring method, a power control method, a data transmission method, a terminal, a base station and an apparatus of the same. The data transmission method may include: acquiring configuration information for uplink or downlink data transmission; determining whether a front loaded reference signal is transmitted according to the acquired configuration information; in response to determining that the reference signal is transmitted, transmitting the reference signal before the data transmission or at the same time when the data transmission starts and performing uplink data
(Continued)

transmission or downlink data reception; and in response to determining that the reference signal is not transmitted, directly performing the uplink data transmission or the downlink data reception.

12 Claims, 12 Drawing Sheets

(51) Int. Cl.
| | | |
|---|---|---|
| *H04W 52/36* | (2009.01) | |
| *H04W 72/0446* | (2023.01) | |
| *H04W 72/1263* | (2023.01) | |
| *H04W 72/23* | (2023.01) | |

(52) U.S. Cl.
CPC ..... *H04W 52/367* (2013.01); *H04W 72/0446* (2013.01); *H04W 72/1263* (2013.01); *H04W 72/23* (2023.01)

(58) Field of Classification Search
CPC ............ H04W 72/1263; H04W 72/23; H04W 52/247; H04W 52/248; H04W 52/325; H04L 5/0048; H04L 5/0053; H04L 5/14; H04L 5/0007; H04L 5/0044; H04L 5/0078; H04B 17/345
See application file for complete search history.

(56) References Cited

U.S. PATENT DOCUMENTS

| | | | |
|---|---|---|---|
| 2018/0132269 A1 | 5/2018 | Wang et al. | |
| 2018/0323887 A1 | 11/2018 | Azarian Yazdi et al. | |
| 2018/0367244 A1 | 12/2018 | Yang et al. | |
| 2020/0213057 A1 | 7/2020 | Bala et al. | |
| 2021/0168011 A1* | 6/2021 | Davydov | H04L 5/0048 |

FOREIGN PATENT DOCUMENTS

| | | |
|---|---|---|
| EP | 3 316 611 A1 | 5/2018 |
| WO | 2018/128039 A1 | 7/2018 |
| WO | 2018/128851 A2 | 7/2018 |
| WO | 2018/231626 A1 | 12/2018 |

OTHER PUBLICATIONS

LG Electronics, Details of UL-DL Reconfiguration Message, 3GPP TSG RAN WG1 Meeting #74bis, R1-134387, Sep. 28, 2013, Guangzhou, China.
Sony, L1 enhancements on PUSCH for URLLC, 3GPP TSG RAN WG1 Ad-Hoc Meeting 1901, R1-1900372, Jan. 20, 2019, Taipei, Taiwan.
CATT, Multiplexing of UCI and UL data on PUSCH, 3GPP TSG RAN WG1 Meeting #90bis, R1-1717831, Oct. 8, 2017, Prague, CZ.
European Search Report dated Dec. 6, 2021, issued in European Application No. 20772869.2.
European Search Report dated Feb. 24, 2022, issued in European Application No. 20772869.2.
3GPP; TSG RAN; NR; Physical layer procedures for data (Release 15), 3GPP TS 38.214 V15.4.0, Jan. 11, 2019.
NTT Docomo, Inc., 'Views on CSI measurement for NR', R1-1713913, 3GPP TSG RAN WG1 Meeting #90, Prague, Czechia, Aug. 12, 2017.
3GPP TS 38.211 V15.4.0 (Dec. 2018) 3rd Generation Partnership Project; Technical Specification Group Radio Access Network; NR; Physical channels and modulation (Release 15).
Indian Office Action dated Aug. 2, 2023, issued in Indian Application No. 202117042717.
Indian Notice of Hearing dated Apr. 24, 2024, issued in Indian Patent Application No. 202117042717.

* cited by examiner

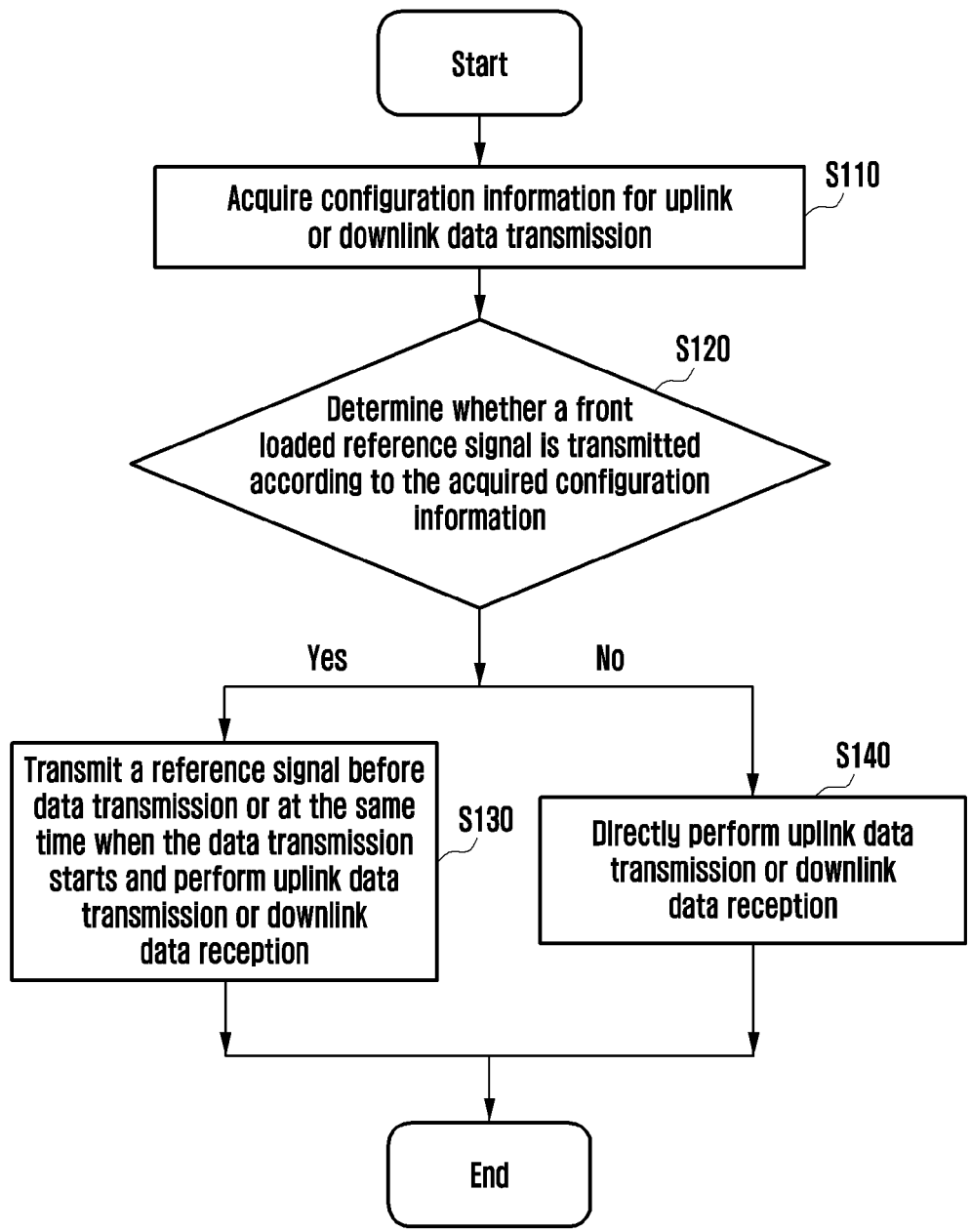
[Fig. 1]

[Fig. 2]
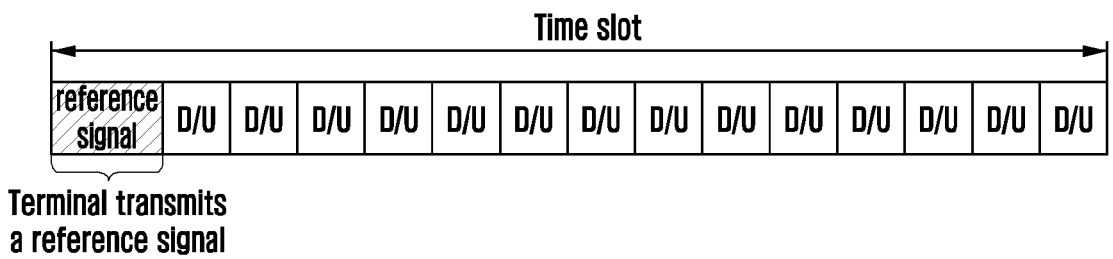
(a)
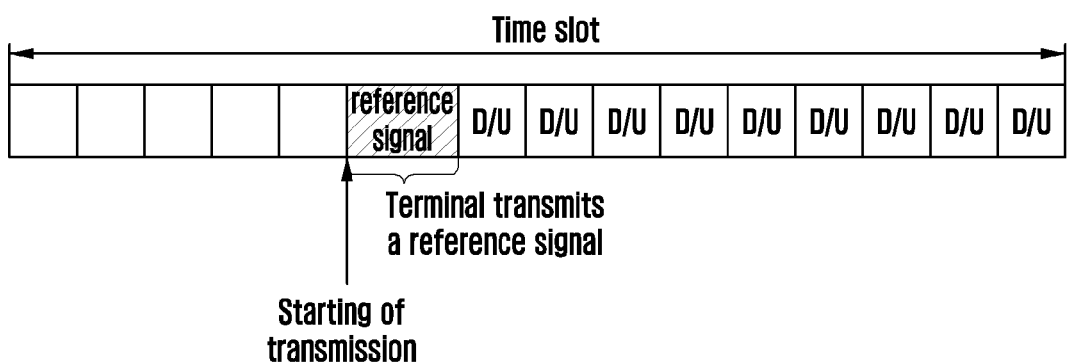
(b)

[Fig. 3]
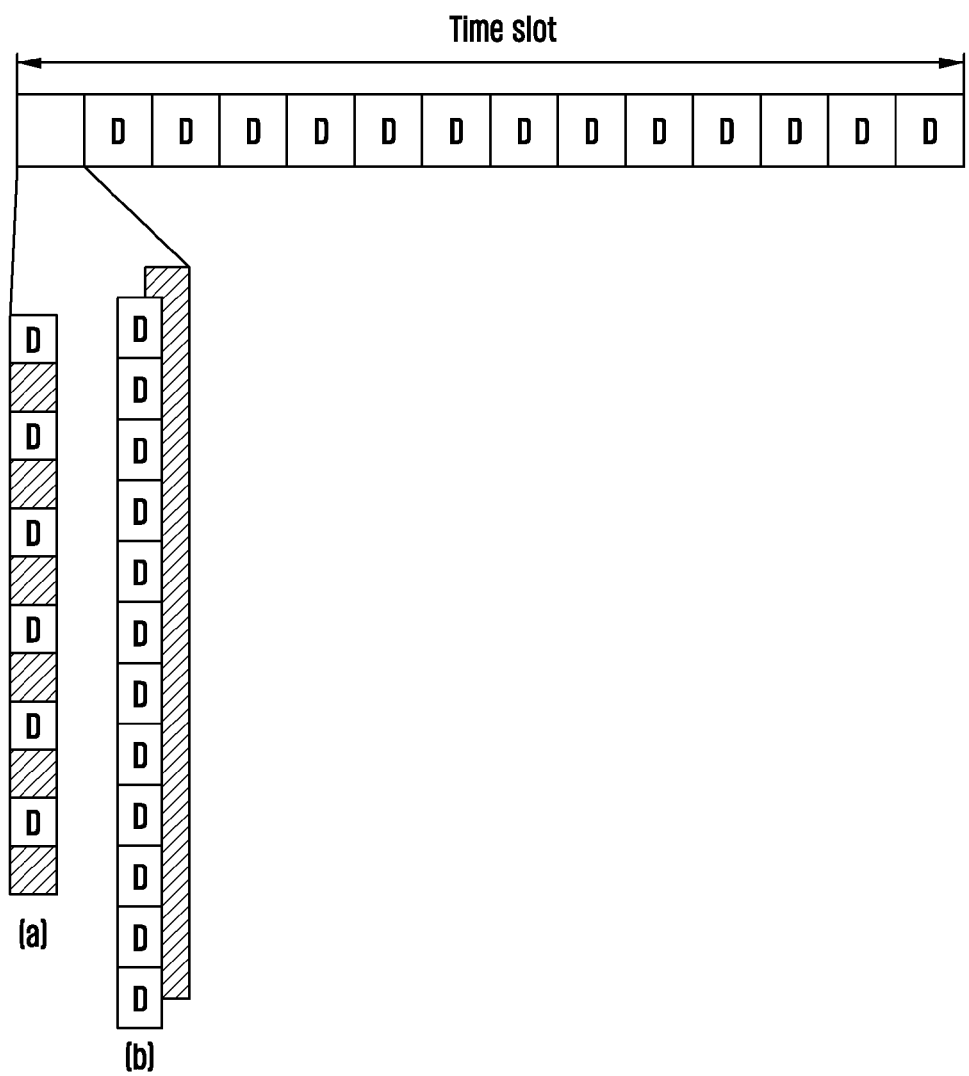

[Fig. 4]
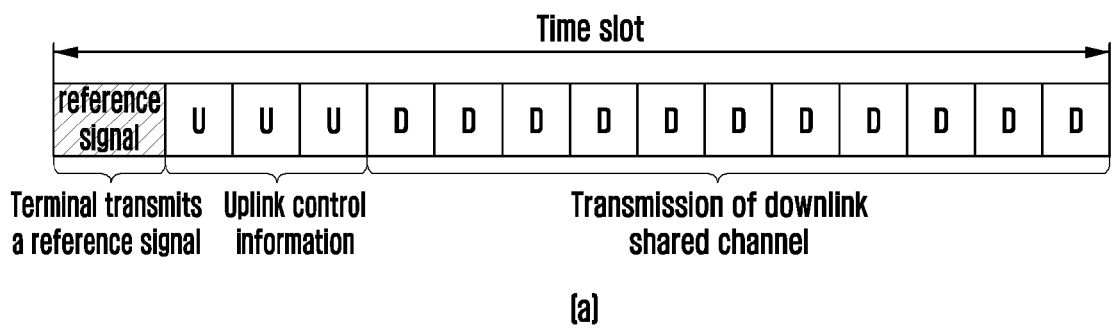
(a)
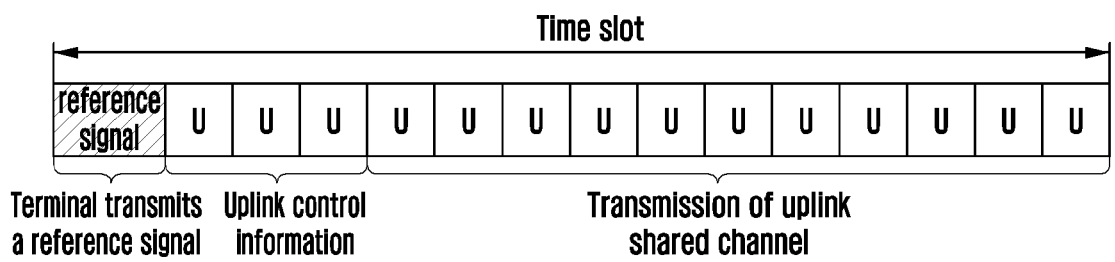
(b)

[Fig. 5]
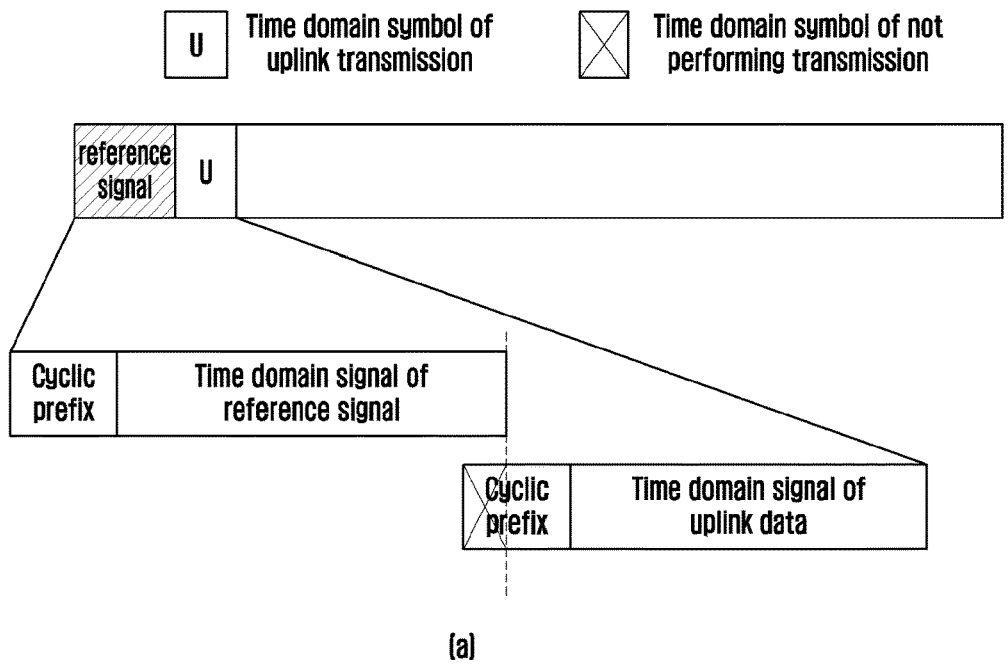
(a)
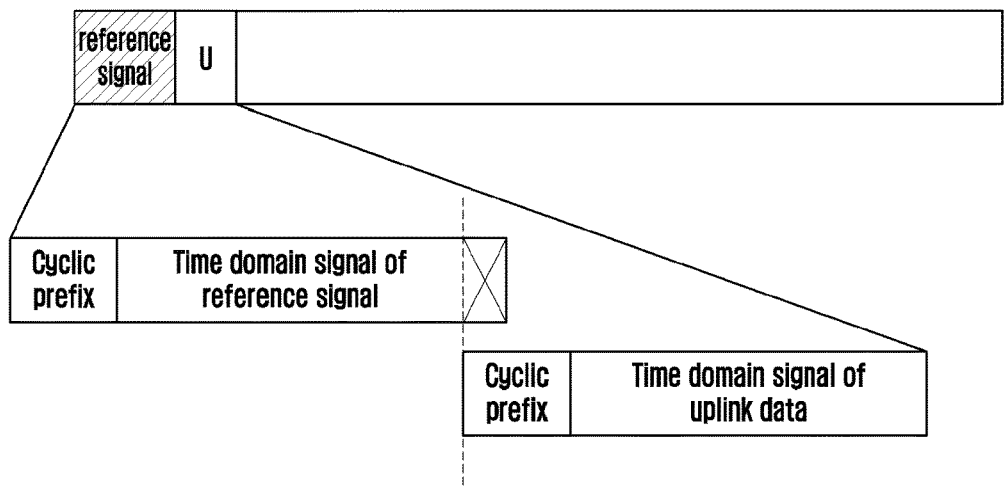
(b)
[Fig. 6]
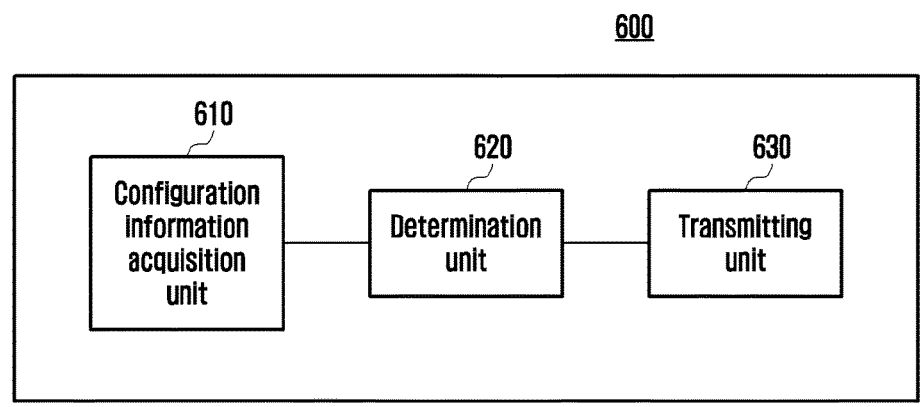

[Fig. 7]
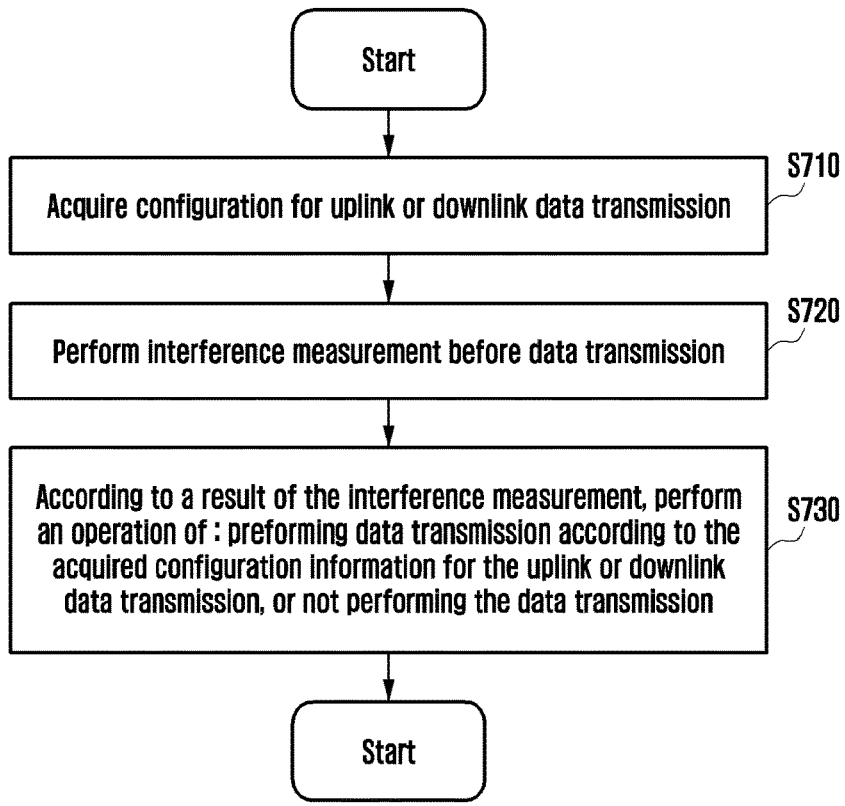
[Fig. 8]
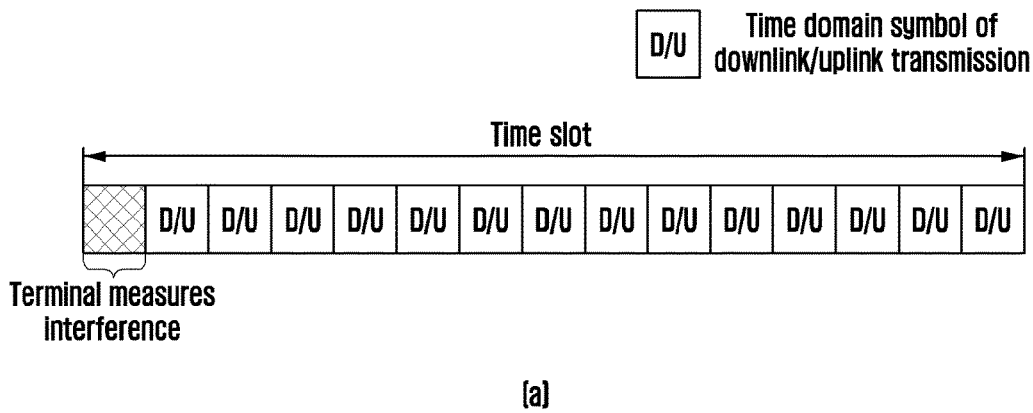
(a)
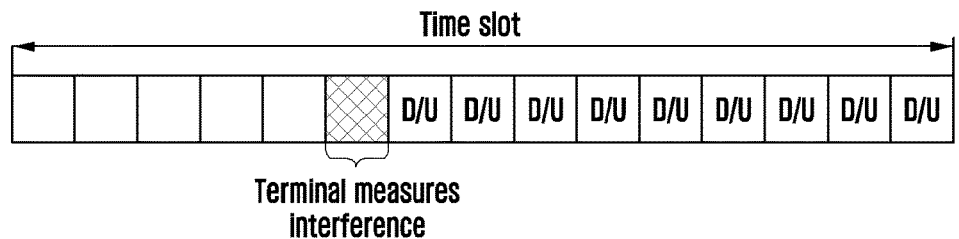
(b)

[Fig. 9]
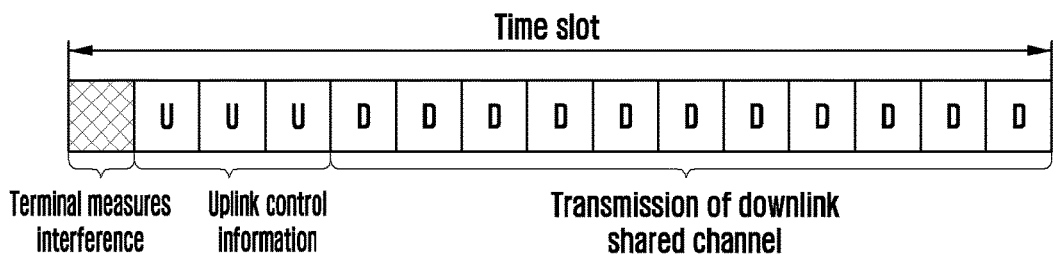
(a)
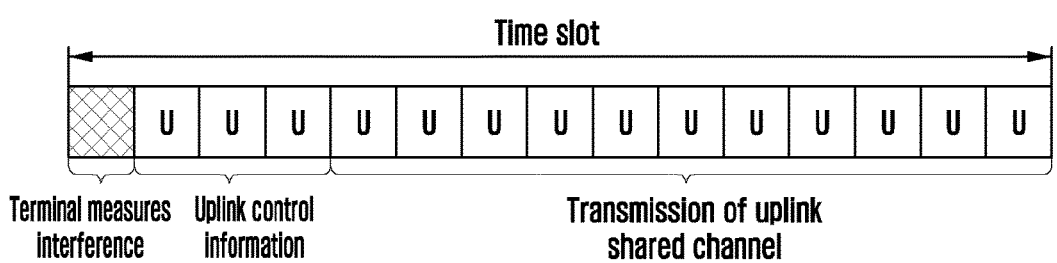
(b)
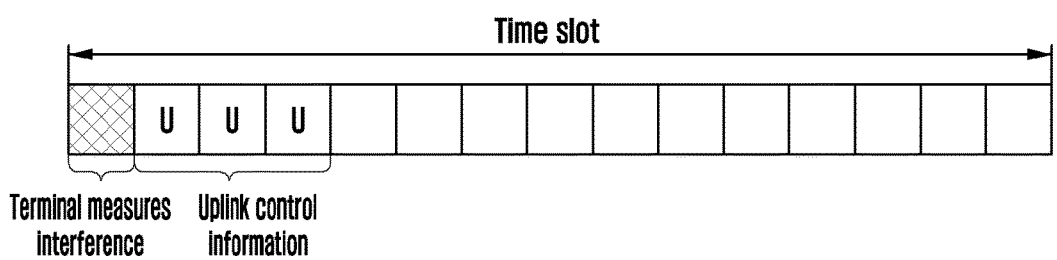
(c)
[Fig. 10]
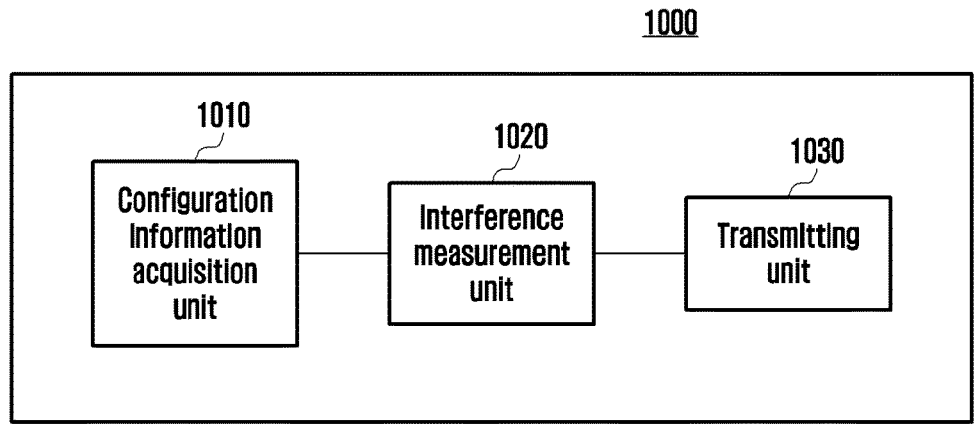

[Fig. 11]
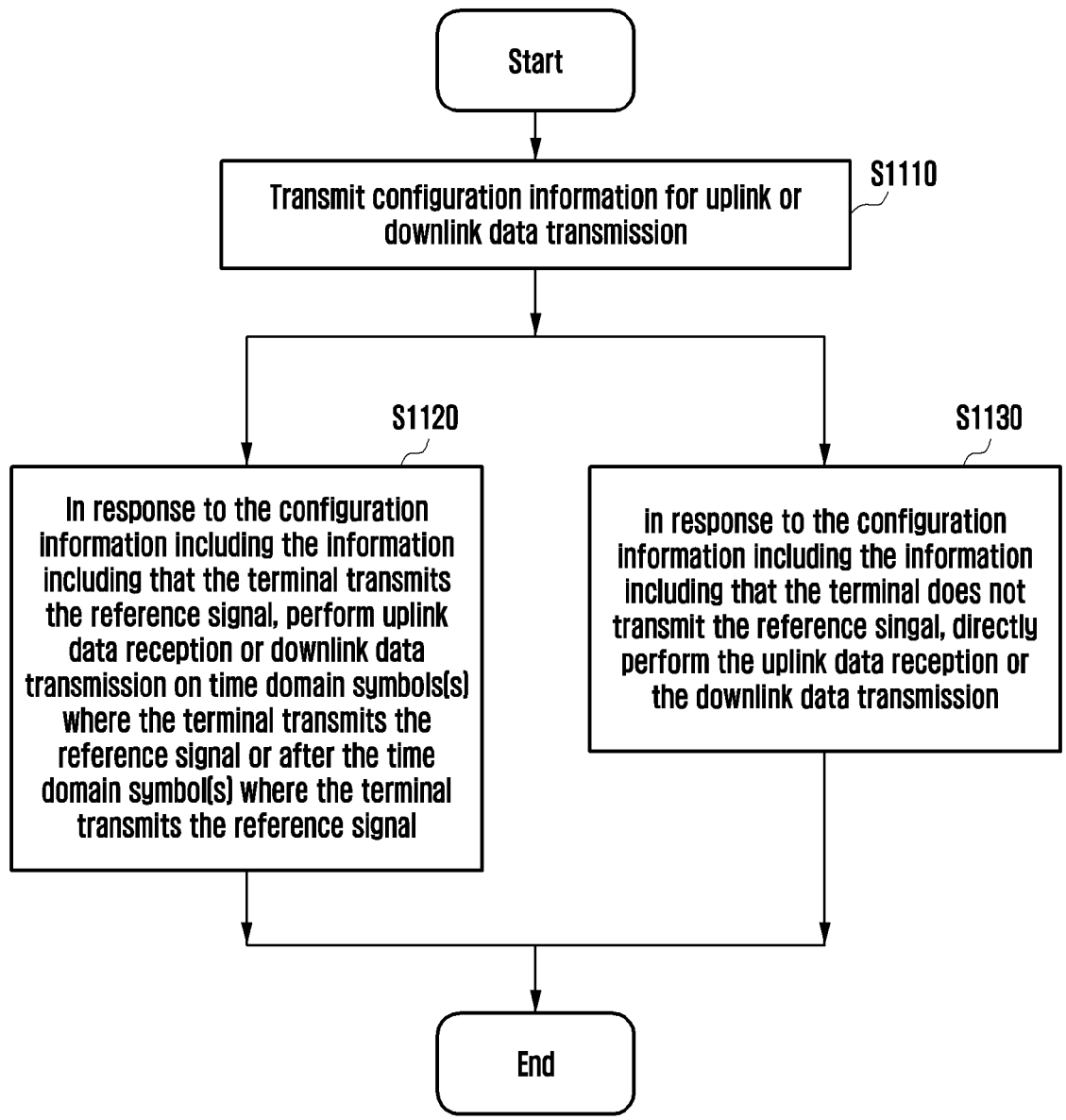
[Fig. 12]
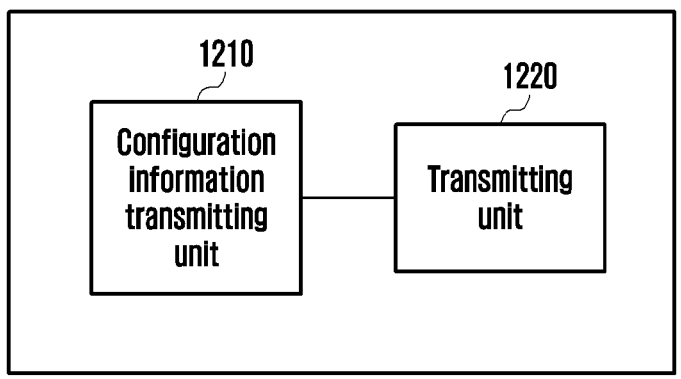

[Fig. 13]
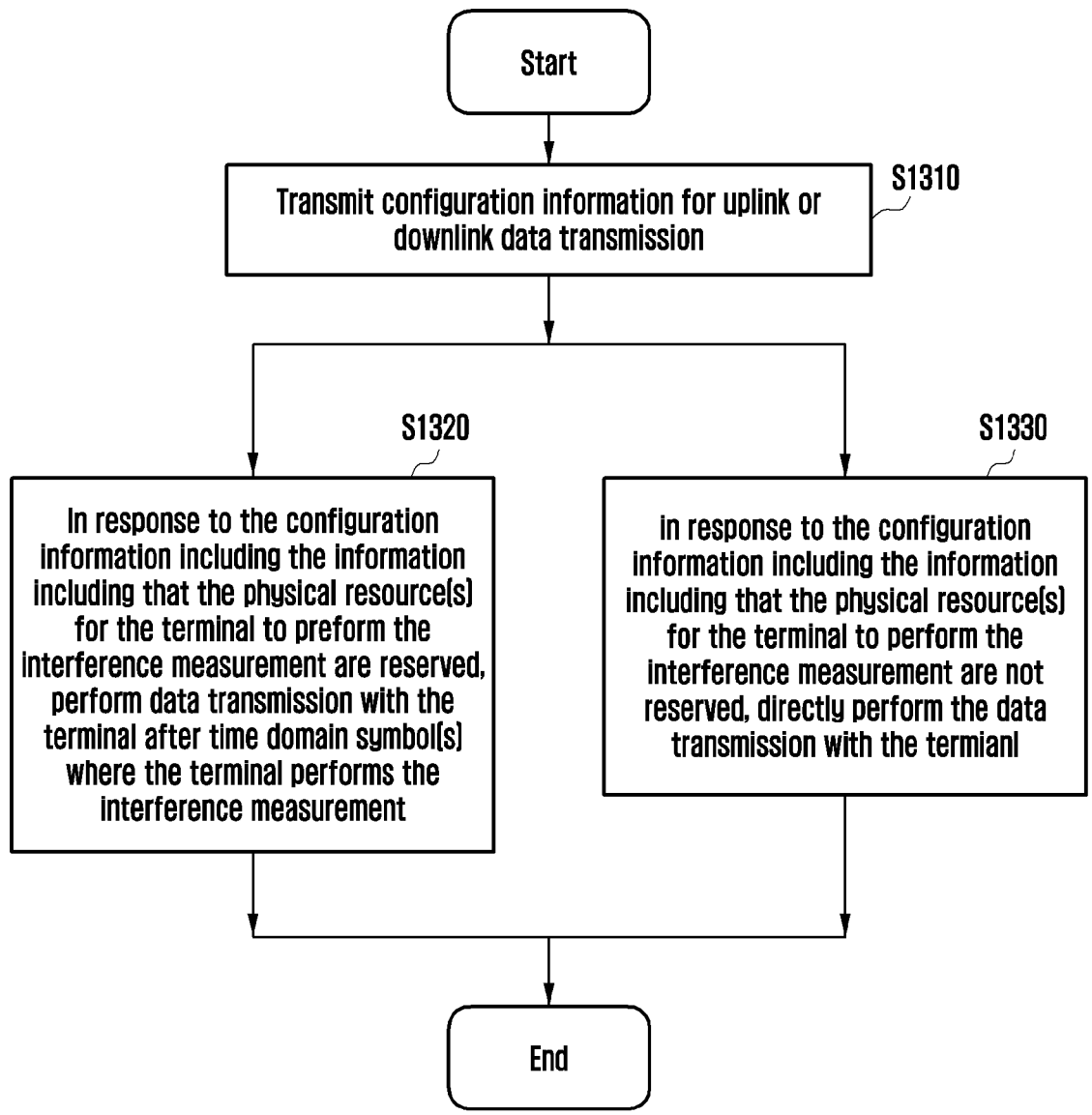
[Fig. 14]
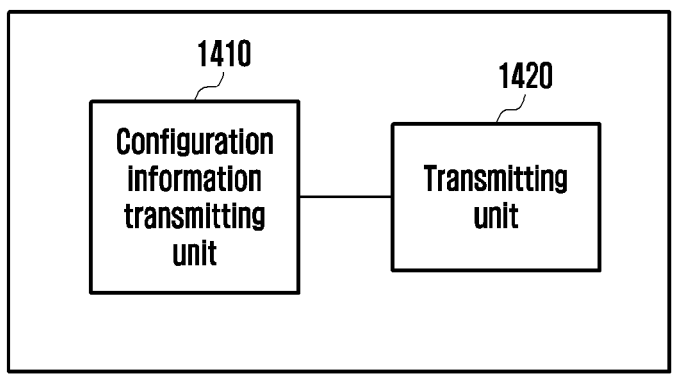

[Fig. 15]
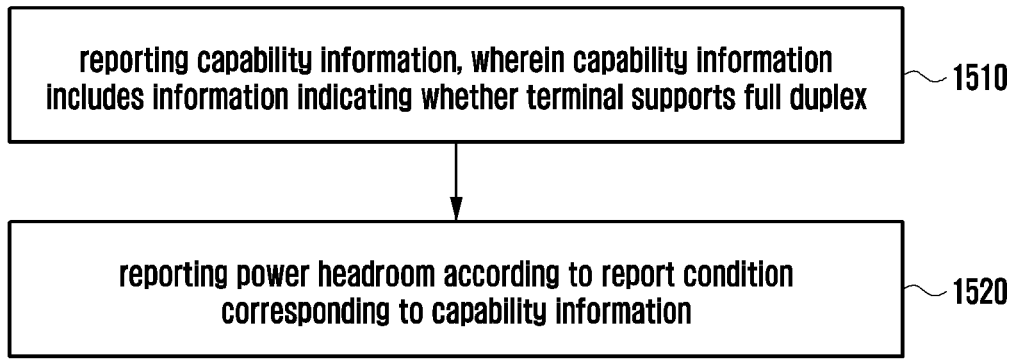
[Fig. 16]
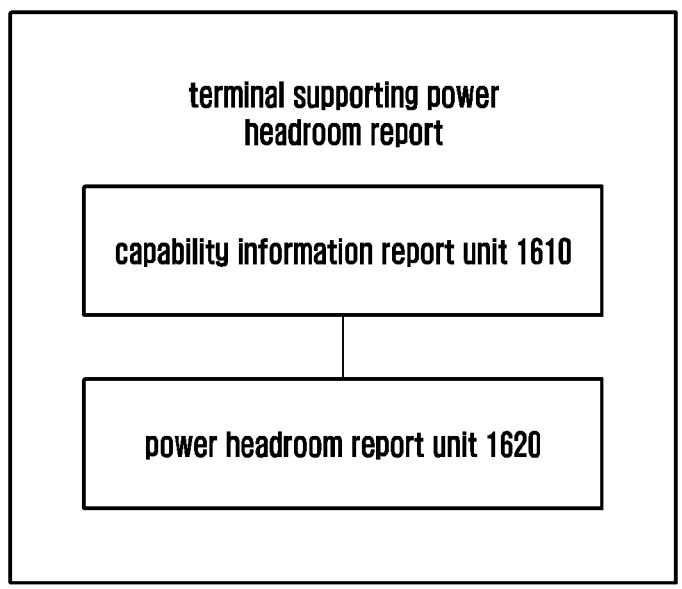
[Fig. 17]
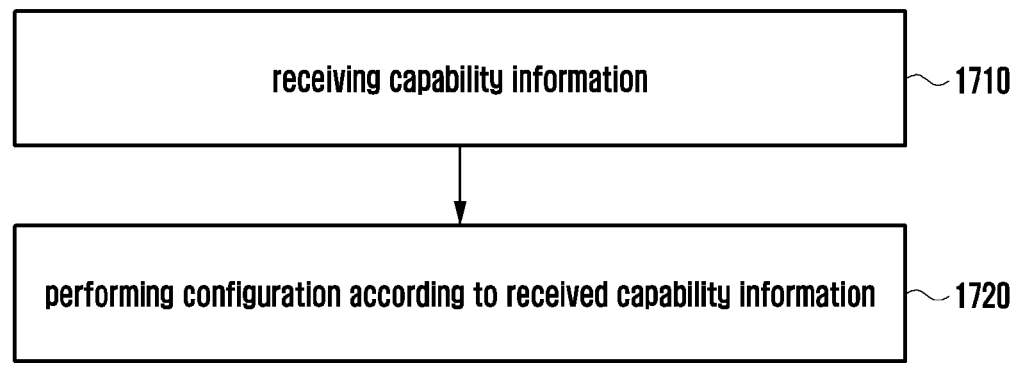

[Fig. 18]
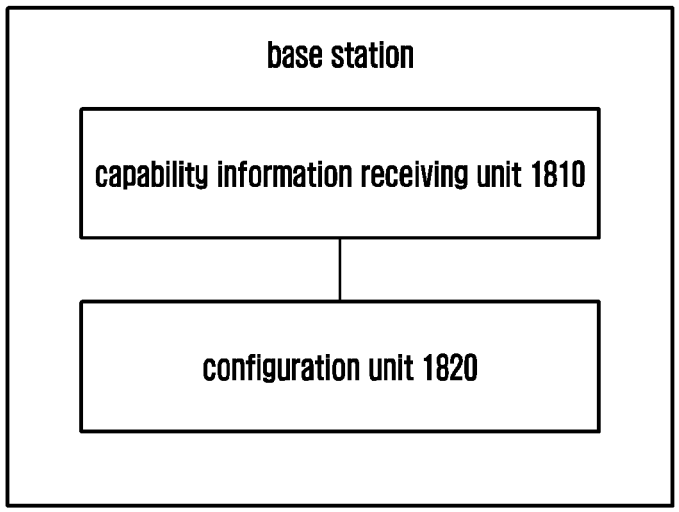
[Fig. 19]
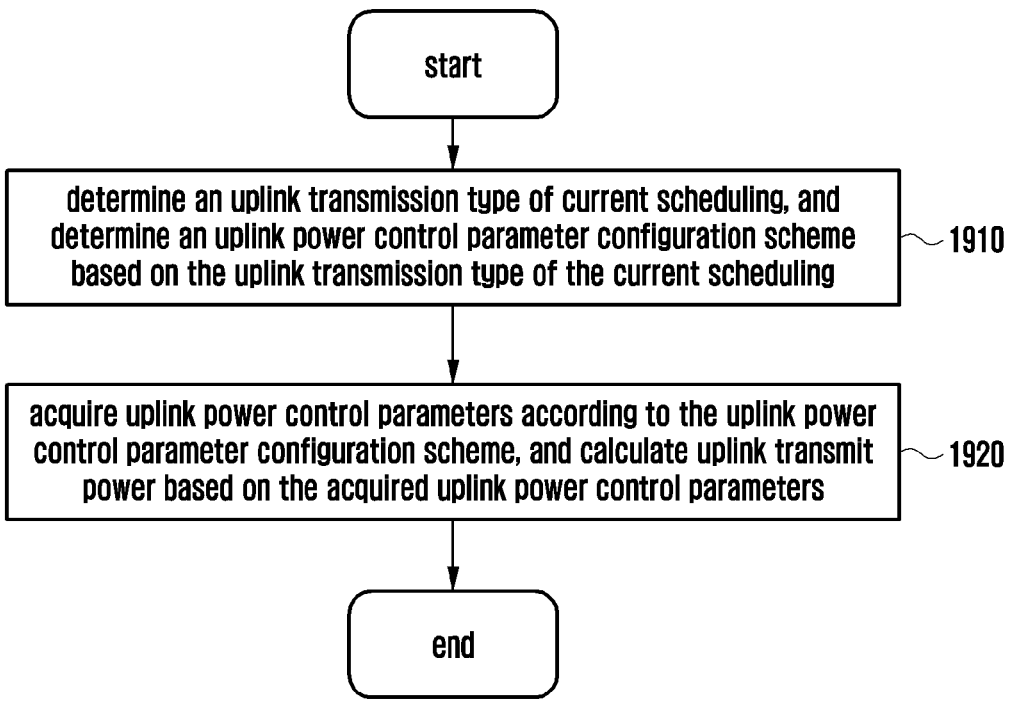

[Fig. 20]
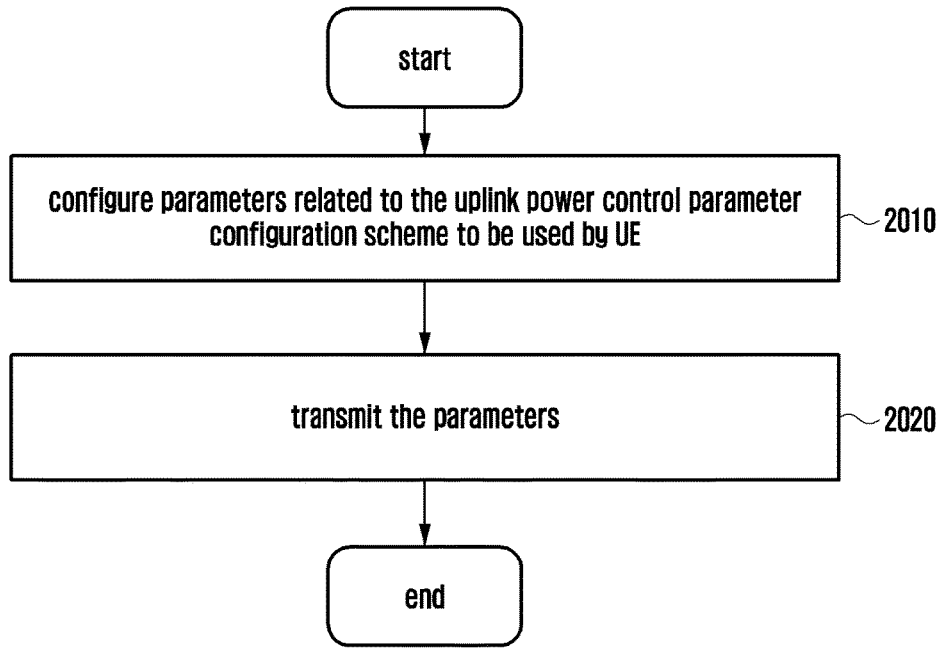
[Fig. 21]
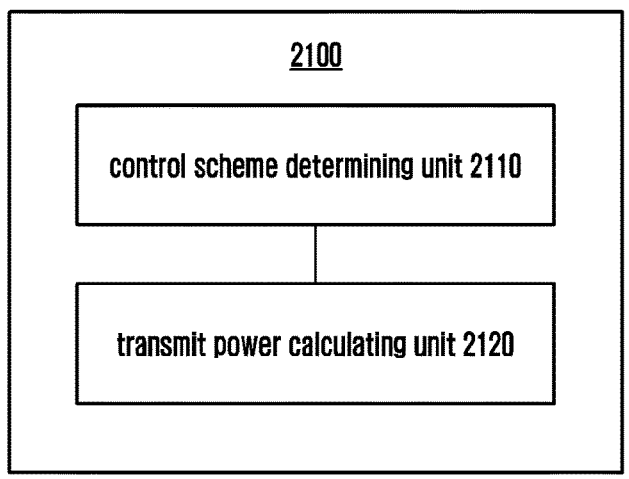
[Fig. 22]
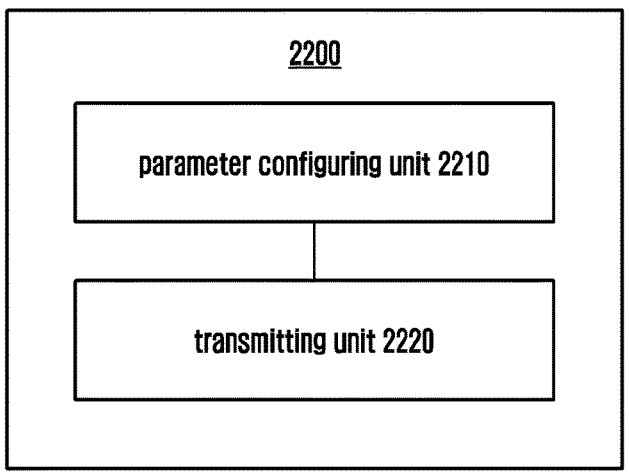

POWER HEADROOM REPORT, CONFIGURING, POWER CONTROL, AND DATA TRANSMISSION METHOD, APPARATUS, TERMINAL, AND BASE STATION

TECHNICAL FIELD

The present application relates to a wireless communication technical field, more particularly, to a Power Headroom Report (PHR) method, a configuring method, a power control method, a data transmission method, a terminal, a base station, and an apparatus of the same.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

According to an estimation of the International Telecommunication Union (ITU), by 2020, global mobile data traffic per month will reach 62 Exabytes (EBs, wherein $1EB=2^{30}$ GB), and from 2020 to 2030, global mobile data services will grow at a rate of about 55% per year. In addition, proportions of video services and machine to machine communication services in mobile data services will gradually increase; by 2030, the video services will be six times more than non-video services, and the machine to machine communication services will account for around 12% of the mobile data services (referring to *IMT traffic estimates for the years 2020 to 2030, Report ITU-R M.2370-0*).

DISCLOSURE OF INVENTION

Technical Problem

Since the cross-link interference may be only measured at a terminal and may be generated only after the completion of the scheduling, a base station cannot obtain a measurement result of the cross-link interference between any two terminals, and this means that the full-duplex transmission based on scheduling may not resolve the problem on cross-link interference between terminals.

Solution to Problem

Exemplary embodiments of the present disclosure may overcome a defect in the existing wireless communication technology that reporting corresponding power headroom according to capability information cannot be performed.

In accordance with an exemplary embodiment of the present disclosure, a power headroom report method is provided, wherein the power headroom report method may include: reporting capability information; reporting power headroom according to a report condition corresponding to the capability information, wherein the capability information includes: information indicating whether a terminal supports full duplex.

Alternatively, the reporting the capability information includes at least one of: carrying the capability information in an information element for capability information report; and reporting the capability information through a random access message.

Alternatively, the reporting the capability information through the random access message includes one of: transmitting a random access channel on predetermined physical resource; reporting the capability information in an uplink shared channel of MsgA in a two-step random access procedure; reporting the capability information in an uplink shared channel of Msg3 in a four-step random access procedure, wherein the predetermined physical resource is associated with the capability information and includes at least one of: predetermined random access preamble sequence(s); predetermined time domain resource(s) for transmitting a random access channel; and predetermined frequency domain resource(s) for transmitting a random access channel.

Alternatively, the power headroom report method further includes at least one of: if the terminal selects a preamble sequence in the predetermined preamble sequence group for random access channel, determining that the terminal supports full duplex; and if the terminal transmits the random access channel on predetermined subcarrier(s) and/or predetermined physical resource block(s), determining that the terminal supports full duplex.

Alternatively, the report condition includes: whether an indication of full duplex mode power headroom report for the terminal is obtained, wherein the reporting the power headroom according to the report condition corresponding to the capability information includes: reporting full duplex mode power headroom when the indication is obtained.

Alternatively, the report condition includes: a report situation of the capability information, wherein the reporting the power headroom according to the report condition corresponding to the capability information includes: reporting full duplex mode power headroom when the report of the capability information is accomplished and the capability information includes information indicating that the terminal supports the full duplex.

Alternatively, the report condition includes: an association between a bandwidth or a bandwidth part configured according to the capability information and a duplex mode, wherein the reporting the power headroom according to the report condition corresponding to the capability information includes: reporting full duplex mode power headroom when the frequency domain resource(s) allocated to the terminal for transmission is located in a bandwidth or a bandwidth part associated with the full duplex.

Alternatively, the reporting the power headroom includes reporting full duplex mode power headroom and/or reporting non-full duplex mode power headroom, wherein the reporting full duplex mode power headroom includes reporting at least one of: power headroom of the terminal working under a full duplex mode, maximum transmit power of the terminal working under the full duplex mode, power headroom of the terminal working under a non-full duplex mode, and maximum transmit power of the terminal working under the non-full duplex mode; the power headroom of the terminal working under the non-full duplex mode, the maximum transmit power of the terminal working under the non-full duplex mode, an offset between the power headroom of the terminal working under the full duplex mode and the power headroom of the terminal working under the non-full duplex mode, and an offset between the maximum transmit power of the terminal working under the full duplex mode and the maximum transmit power of the terminal working under the non-full duplex mode.

Alternatively, the reporting the power headroom includes: reporting power headroom through a media access control (MAC) control element (CE), wherein each control element includes an indication field and one of: the power headroom of the terminal working under the full duplex mode, the maximum transmit power of the terminal working under the full duplex mode, an offset between the power headroom of the terminal working under the full duplex mode and the power headroom of the terminal working under the non-full duplex mode, and an offset between the maximum transmit power of the terminal working under the full duplex mode and the maximum transmit power of the terminal working under the non-full duplex mode, wherein the indication field indicates the one.

In accordance with another exemplary embodiment of the present disclosure, a terminal supporting power headroom report is provided, wherein the terminal may include: a capability information report unit configured to report capability information; a power headroom report unit configured to report power headroom according to a report condition corresponding to the capability information, wherein the capability information includes: information indicating whether a terminal supports full duplex.

Alternatively, the capability information report unit carries the capability information in an information element for capability information report, and/or reports the capability information through a random access message.

Alternatively, the capability information report unit reports the capability information through one of: transmitting a random access channel on predetermined physical resource; reporting the capability information in an uplink shared channel of MsgA in a two-step random access procedure; reporting the capability information in an uplink shared channel of Msg3 in a four-step random access procedure, wherein the predetermined physical resource is associated with the capability information and includes at least one of: predetermined random access preamble sequence(s); predetermined time domain resource(s) for transmitting a random access channel; and predetermined frequency domain resource(s) for transmitting a random access channel.

Alternatively, the terminal further includes: a capability determination unit configured to determine that the terminal supports the full duplex if the terminal selects the preamble sequence in the predetermined preamble sequence group for the random access channel; and/or determine that the terminal supports the full duplex if the terminal transmits the random access channel on predetermined subcarrier(s) and/or predetermined physical resource block(s).

Alternatively, the report condition includes: whether an indication of full duplex mode power headroom report for the terminal is obtained, and the power headroom report unit reports the full duplex mode power headroom when the indication is obtained.

Alternatively, the report condition includes: the report situation of the capability information, wherein the power headroom report unit reports the full duplex mode power headroom when the report of the capability information is accomplished and the capability information includes information indicating that the terminal supports the full duplex.

Alternatively, the report condition includes: an association between a bandwidth or a bandwidth part configured according to the capability information and a duplex mode, wherein the power headroom report unit reports the full duplex mode power headroom when the frequency domain resource(s) allocated to the terminal for transmission is located in a bandwidth or a bandwidth part associated with the full duplex.

Alternatively, the power headroom report unit reports the full duplex mode power headroom and/or reports the non-full duplex mode power headroom, wherein the power headroom report unit reports, while reporting the full duplex mode power headroom, at least one of: the power headroom of the terminal working under the full duplex mode, the maximum transmit power of the terminal working under the full duplex mode, the power headroom of the terminal working under the non-full duplex mode, and the maximum transmit power of the terminal working under the non-full duplex mode; the power headroom of the terminal working under the non-full duplex mode, the maximum transmit power of the terminal working under the non-full duplex mode, the offset between the power headroom of the terminal working under the full duplex mode and the power headroom of the terminal working under the non-full duplex mode, and the offset between the maximum transmit power of the terminal working under the full duplex mode and the maximum transmit power of the terminal working under the non-full duplex mode.

Alternatively, the power headroom report unit reports the power headroom through the MAC CE, wherein each control element includes an indication field and one of: the power headroom of the terminal working under the full duplex mode; the maximum transmit power of the terminal working under the full duplex mode; the offset between power headroom of the terminal working under the full duplex mode and the power headroom of the terminal working under the non-full duplex mode; and the offset between the maximum transmit power of the terminal working under the full duplex mode and the maximum transmit power of the terminal working under the non-full duplex mode, wherein the indication field indicates the one.

In accordance with another exemplary embodiment of the present disclosure, a base station is provided, wherein the base station may include: a capability information receiving unit configured to receive capability information; a configuration unit configured to perform configuration according to the received capability information, wherein the configuration performed by the configuration unit includes at least one of: transmitting an indication for notifying the terminal of reporting full duplex mode power headroom according to the capability information; transmitting a reception feedback with respect to the capability information; and configuring a bandwidth for the terminal according to the capability information, wherein the capability information includes: information indicating whether a terminal supports full duplex.

In accordance with another exemplary embodiment of the present disclosure, a configuration method executed by the base station is provided, wherein the configuration method may include: receiving capability information; performing configuration according to the received capability information, wherein the performing the configuration includes at least one of: transmitting an indication for notifying the terminal of reporting full duplex mode power headroom according to the capability information; transmitting the reception feedback with respect to the capability information; and configuring a bandwidth for the terminal according to the capability information, wherein the capability information includes: information indicating whether a terminal supports full duplex.

In accordance with another exemplary embodiment of the present disclosure, a system including at least one computing device and at least one storage device for storing an instruction is provided, wherein the instruction enables the at least one computing device to perform the method as described above when being operated by the at least one computing device.

In accordance with another exemplary embodiment of the present disclosure, a computer readable storage medium storing an instruction is provided, wherein the instruction enables at least one computing device to perform the method as described above when being operated by the at least one computing device.

According to an exemplary embodiment of the present disclosure, there is provided a power control method performed by a User Equipment (UE), which includes: determining an uplink transmission type of current scheduling, and determining an uplink power control parameter configuration scheme based on the uplink transmission type of the current scheduling; and acquiring uplink power control parameters according to the determined uplink power control parameter configuration scheme, and calculating uplink transmit power based on the acquired uplink power control parameters.

Alternatively, the uplink transmission type may include: full-duplex transmission or non full-duplex transmission.

Alternatively, the determining of the uplink transmission type may include: acquiring a signaling indication on a transmission type of uplink physical channel or uplink physical signal, and determining the uplink transmission type based on the signaling indication; or acquiring a predetermined indication command, and determining the uplink transmission type according to an association between the predetermined indication command and the uplink transmission type.

Alternatively, the uplink power control parameters may include Transmit Power Control (TPC) command. The uplink power control parameter configuration scheme may include at least one of a TPC command mode and a TPC command indication field definition. The TPC command mode may include one of an accumulated TPC mode and an absolute TPC mode. The TPC command indication field definition may include at least one of the number of bits of the TPC command indication field, and an association between the TPC command indication bit states and the TPC commands.

Alternatively, the determining of the uplink power control parameter configuration scheme may include: determining the uplink power control parameter configuration scheme based on a predetermined association between the uplink transmission type and the uplink power control parameter configuration scheme.

Alternatively, the determining of the uplink power control parameter configuration scheme may include: receiving a signaling indicating a corresponding uplink power control parameter configuration scheme under different uplink transmission types, and determining the uplink power control parameter configuration scheme based on the signaling and the uplink transmission type.

Alternatively, the determining of the uplink power control parameter configuration scheme may include: determining a corresponding uplink power control parameter configuration scheme based on the uplink transmission type of the current scheduling and the uplink transmission type of the previous scheduling.

Alternatively, the determining of the uplink power control parameter configuration scheme based on a predetermined association between the uplink transmission type and the uplink power control parameter configuration scheme may include: determining the TPC command indication field definition to be used based on the predetermined association between the uplink transmission type and the TPC command indication field definition, wherein for different uplink transmission types, the numbers of the bits of the TPC command indication field may be the same, and the associations between the TPC command indication bit states and the TPC commands may be different; or, for different uplink transmission types, the numbers of bits of the TPC command indication field and the associations between the TPC command indication bit states and TPC commands may be different.

Alternatively, the uplink power control parameter configuration scheme may include a power shifting scheme, and the uplink power control parameters may include a power offset to be added to the uplink transmit power or target receive power, wherein the determining of the uplink power control parameter configuration scheme may include: adding the power offset to the uplink transmit power or the target receive power when the uplink transmission type of the current scheduling is full-duplex transmission; otherwise, no power offset is added to the uplink transmit power or the target receive power.

According to another exemplary embodiment of the present disclosure, there is provided a User Equipment (UE), which includes: a control scheme determining unit configured to determine an uplink transmission type of current scheduling, and determine an uplink power control parameter configuration scheme based on the uplink transmission type of the current scheduling; and a transmit power calculating unit configured to acquire uplink power control parameters according to the determined uplink power control parameter configuration scheme, and calculate uplink transmit power based on the acquired uplink power control parameters.

Alternatively, the control scheme determining unit may be configured to: acquire a signaling indication on a transmission type of uplink physical channel or uplink physical signal from the base station, and determine the uplink transmission type based on the signaling indication; or acquire a predetermined indication command from the base station, and determine the uplink transmission type according to an association between the predetermined indication command and the uplink transmission type.

Alternatively, the control scheme determining unit may be configured to: determine the uplink power control parameter configuration scheme based on a predetermined association between the uplink transmission type and the uplink power control parameter configuration scheme.

Alternatively, the control scheme determining unit may be configured to: receive a signaling indicating a corresponding uplink power control parameter configuration scheme under different uplink transmission types from the base station, and determine the uplink power control parameter configuration scheme based on the signaling and the uplink transmission type.

Alternatively, the control scheme determining unit may be configured to: determine a corresponding uplink power control parameter configuration scheme based on the uplink transmission type of the current scheduling and the uplink transmission type of the previous scheduling.

Alternatively, the control scheme determining unit may be configured to determine the TPC command indication field definition to be used based on the predetermined association between the uplink transmission type and the TPC command indication field definition, wherein for different uplink transmission types, the number of the bits of the TPC command indication field may be the same, and the associations between the TPC command indication bit states and the TPC commands may be different; or, for different uplink transmission types, the numbers of bits of the TPC command indication field and the associations between the TPC command indication bit states and TPC commands may be different.

Alternatively, the uplink power control parameter configuration scheme may include a power shifting scheme, and the uplink power control parameters may include a power offset to be added to the uplink transmit power or target receive power, wherein the control scheme determining unit may be configured to: add the power offset to the uplink transmit power or the target receive power when the uplink transmission type of the current scheduling is a full-duplex transmission; otherwise, no power offset is added to the uplink transmit power or the target receive power.

According to another exemplary embodiment of the present disclosure, there is provided a parameter configuration method for power control, which includes: configuring parameters related to an uplink power control parameter configuration scheme to be used by a User Equipment (UE), wherein the parameters are associated with an uplink transmission type; and transmitting the parameters to the UE so that the UE is able to determine the uplink power control parameter configuration scheme by using the parameters based on an uplink transmission type of current scheduling.

According to another exemplary embodiment of the present disclosure, there is provided a base station, which includes: a parameter configuring unit configured to configure parameters related to an uplink power control parameter configuration scheme to be used by a User Equipment (UE), wherein the parameters are associated with an uplink transmission type; and a transmitting unit configured to transmit the parameters to the UE so that the UE is able to determine the uplink power control parameter configuration scheme by using the parameters based on an uplink transmission type of current scheduling.

According to another exemplary embodiment of the present disclosure, there is provided a wireless communication system that includes a base station and a UE according to the aforementioned exemplary embodiments.

According to another exemplary embodiment of the present disclosure, there is provided a power control method in a wireless communication system, wherein the wireless communication system includes a base station and a UE, the UE may implement the power control method according to the aforementioned exemplary embodiments, and the base station may implement the parameter configuration method according to the aforementioned exemplary embodiments.

Regarding the problem of the cross-link interference existing in full-duplex transmission, the present disclosure introduces a "listen-before-talk" mechanism to resolve an inter-cell cross-link interference problem. The so called "listen-before-talk" refers to that a terminal firstly measures a magnitude of the cross-link interference on the allocated physical resource before transmission, and then performs data transmission when the magnitude of the interference is within a tolerable range.

According to an aspect of the present disclosure, a data transmission method performed by a terminal is provided, and the data transmission method may include: acquiring configuration information for uplink or downlink data transmission; determining whether a front loaded reference signal is transmitted according to the acquired configuration information; in response to determining that the reference signal is transmitted, transmitting the reference signal before the data transmission or at the same time when the data transmission starts and performing uplink data transmission or downlink data reception; and in response to determining that the reference signal is not transmitted, directly performing the uplink data transmission or the downlink data reception.

According to an exemplary embodiment, the determining whether the front loaded reference signal is transmitted may include: determining whether the reference signal is transmitted according to indication information in uplink or downlink scheduling grant information or uplink or downlink semi-persistent scheduling configuration information included in the configuration information; or determining whether the reference signal is transmitted according to information related to physical resource(s) for the uplink or downlink data transmission acquired through the uplink or downlink scheduling grant information or the uplink or downlink semi-persistent scheduling configuration information.

According to the exemplary embodiment, the transmitting of the reference signal may include: acquiring configuration information of the reference signal, and transmitting the reference signal according to the configuration information of the reference signal, wherein the configuration information of the reference signal includes at least one of: sequence(s) of transmitting the reference signal, the number of time domain symbol(s) used for transmitting the reference signal or index(es) of the time domain symbol(s) used for transmitting the reference signal, a reference signal pattern, a bandwidth for transmitting the reference signal, and transmit power of the reference signal.

According to the exemplary embodiment, the transmitting of the reference signal includes: transmitting the reference signal using a first sub frame structure in which at least one time domain symbol for transmitting the reference signal is comprised, wherein if the reference signal is transmitted before the data transmission, the at least one time domain symbol is previous to time domain symbols used by the uplink or downlink data transmission, and if the reference signal is transmitted at the same time when the data transmission starts, the at least one time domain symbol is first several time domain symbols used by the uplink or downlink data transmission.

According to the exemplary embodiment, if the reference signal is transmitted at the same time when the data transmission starts, physical resource element(s) for transmitting the reference signal and physical resource element(s) for the data transmission are the physical resource elements of different subcarriers on the same time domain symbol, or the physical resource element(s) for transmitting the reference signal and the physical resource element(s) for the data transmission are the same physical resource element(s).

According to the exemplary embodiment, the data transmission method may further include: transmitting uplink control information using the first sub frame structure, wherein a starting time domain symbol for transmitting the uplink control information is not earlier than a last time domain symbol for transmitting the reference signal, and wherein the uplink control information at least includes essential information for grant-free transmission of uplink or downlink shared channel.

According to the exemplary embodiment, timing advance for transmitting the reference signal and timing advance for transmitting uplink data are different.

According to the exemplary embodiment, when the timing advance for transmitting the reference signal is less than the timing advance for transmitting the uplink data and the time domain symbol for transmitting the reference signal and the time domain symbol for transmitting the uplink data are adjacent to each other, time domain signals before a time domain termination location at which the reference signal is transmitted, among time domain signals of the uplink data are not transmitted while the uplink data transmission is performed, or the time domain signal after a time domain starting location of the uplink data, among time domain signals of the reference signal is not transmitted while the reference signal is transmitted.

According to an aspect of the present disclosure, a terminal for performing data transmission is provided, and the terminal may include: a configuration information acquisition unit configured to acquire configuration information for uplink or downlink data transmission; a determination unit configured to determine whether a front loaded reference signal is transmitted according to the acquired configuration information; and a transmitting unit configured to: in response to determining that the reference signal is transmitted, transmit the reference signal before the data transmission or at the same time when the data transmission starts and perform uplink data transmission or downlink data reception; and in response to determining that the reference signal is not transmitted, directly perform the uplink data transmission or the downlink data reception.

According to the exemplary embodiment, the determination unit may determine whether the reference signal is transmitted according to indication information in uplink or downlink scheduling grant information or uplink or downlink semi-persistent scheduling configuration information included in the configuration information; or the determination unit may determine whether the reference signal is transmitted according to information related to physical resource(s) for the uplink or downlink data transmission acquired through the uplink or downlink scheduling grant information or the uplink or downlink semi-persistent scheduling configuration information.

According to the exemplary embodiment, the transmission unit may acquire configuration information of the reference signal, and transmit the reference signal according to the configuration information of the reference signal, wherein the configuration information of the reference signal includes at least one of: sequence(s) of transmitting the reference signal, the number of time domain symbol(s) used for transmitting the reference signal or index(es) of the time domain symbol(s) used for transmitting the reference signal, a reference signal pattern, a bandwidth for transmitting the reference signal, and transmit power of the reference signal.

According to the exemplary embodiment, the transmitting unit may transmit the reference signal using a first sub frame structure in which at least one time domain symbol for transmitting the reference signal is included, wherein if the reference signal is transmitted before the data transmission, the at least one time domain symbol is previous to time domain symbols used by the uplink or downlink data transmission, and if the reference signal is transmitted at the same time when the data transmission starts, the at least one time domain symbol is first several time domain symbols used by the uplink or downlink data transmission.

According to the exemplary embodiment, if the reference signal is transmitted at the same time when the data transmission starts, physical resource element(s) for transmitting the reference signal and physical resource element(s) for the data transmission are the physical resource elements of different subcarriers on the same time domain symbol, or the physical resource element(s) for transmitting the reference signal and the physical resource element(s) for the data transmission are the same physical resource element(s).

According to the exemplary embodiment, a transmitting unit may further transmit uplink control information using the first sub frame structure, wherein a starting time domain symbol for transmitting the uplink control information is not earlier than a last time domain symbol for transmitting the reference signal, and wherein the uplink control information at least includes essential information for grant-free transmission of uplink or downlink shared channel.

According to the exemplary embodiment, timing advance for transmitting the reference signal and timing advance for transmitting uplink data are different.

According to the exemplary embodiment, when the timing advance for transmitting the reference signal is less than the timing advance for transmitting the uplink data and the time domain symbol for transmitting the reference signal and the time domain symbol for transmitting the uplink data are adjacent to each other, the transmitting unit does not transmit time domain signals before a time domain termination location at which the reference signal is transmitted, among time domain signals of the uplink data while the uplink data transmission is performed, or does not transmit the time domain signal after a time domain starting location of the uplink data, among time domain signals of the reference signal while the reference signal is transmitted.

According to another aspect of the present disclosure, a data transmission method performed by a terminal is provided, and the data transmission method may include: acquiring configuration information for uplink or downlink data transmission; performing interference measurement before the data transmission; and according to a result of the interference measurement, performing an operation of: performing the data transmission according to the acquired configuration information for the uplink or downlink data transmission, or not performing the data transmission.

According to the exemplary embodiment, the performing of the interference measurement may include: receiving a reference signal for the interference measurement, and performing the interference measurement according to the reference signal.

According to the exemplary embodiment, the receiving of the reference signal may include: receiving the reference signal using a second sub frame structure, wherein in the second sub frame structure, at least one time domain symbol for the interference measurement is included, and the at least one time domain symbol is previous to time domain symbols used by the uplink or downlink data transmission, and wherein the reference signal is received on the at least one time domain symbol.

According to the exemplary embodiment, the not performing of the interference measurement may include: not performing uplink data transmission or downlink data reception on physical resource(s) indicated by the configuration information, in addition to receiving the reference signal on the at least one time domain symbol for the interference measurement; and if the configuration information for the uplink or downlink data transmission is uplink or downlink scheduling grant information, the not performing of the data transmission includes: transmitting, after the at least one time domain symbol for the interference measurement, feedback information on terminating transmission of uplink or downlink shared channel within a scheduled time slot.

According to the exemplary embodiment, the data transmission method may further include: transmitting uplink control information using the second sub frame structure, wherein in the second sub frame structure, the time domain symbol for transmitting the uplink control information is after the at least one time domain symbol for the interference measurement.

According to the exemplary embodiment, the uplink control information may include at least one of: necessary configuration information on grant-free transmission of uplink shared channel, necessary configuration information on grant-free transmission of downlink shared channel and feedback information on terminating the transmission of uplink or downlink shared channel within the scheduled time slot.

According to the exemplary embodiment, when the reference signal is the reference signal transmitted using the first sub frame structure, the time domain symbol for transmitting the reference signal included in the first sub frame structure and the time domain symbol for the interference measurement included in the second sub frame structure are the time domain symbol of a same index within a same time slot, wherein the time domain symbol for transmitting the reference signal in the first sub frame structure is before the time domain symbols used by the uplink or downlink data transmission.

According to the exemplary embodiment, the reference signal may include a front loaded reference signal transmitted by another terminal and/or a downlink reference signal transmitted by a base station, for another cell where the terminal is not located.

According to the exemplary embodiment, in the case where the reference signal is the front loaded reference signal transmitted by the another terminal, the data transmission method may further include: acquiring configuration information of the reference signal, wherein the receiving of the reference signal includes: receiving the reference signal according to the acquired configuration information of the reference signal, wherein the configuration information of the reference signal includes at least one of: sequence(s) of transmitting the reference signal, the number of time domain symbol(s) used for transmitting the reference signal or index(es) of the time domain symbol(s) used for transmitting the reference signal, a reference signal pattern, a bandwidth for transmitting the reference signal, and transmit power of the reference signal.

According to another aspect of the present disclosure, a terminal for performing data transmission is provided, and the terminal may include: a configuration information acquisition unit configured to acquire configuration information for uplink or downlink data transmission; an interference measurement unit configured to perform interference measurement before the data transmission; and a transmitting unit configured to, according to a result of the interference measurement, perform an operation of: performing the data transmission according to the acquired configuration information for the uplink or downlink data transmission, or not performing the data transmission.

According to the exemplary embodiment, the interference measurement unit may receive a reference signal for the interference measurement, and perform the interference measurement according to the reference signal.

According to the exemplary embodiment, the interference measurement unit may receive the reference signal using the second sub frame structure, wherein in the second sub frame structure, at least one time domain symbol for the interference measurement is included, and the at least one time domain symbol is previous to time domain symbols used by the uplink or downlink data transmission, and wherein the reference signal is received on the at least one time domain symbol.

According to the exemplary embodiment, the transmission unit may not perform uplink data transmission or downlink data reception on physical resource(s) indicated by the configuration information, in addition to receiving the reference signal on the at least one time domain symbol for the interference measurement. If the configuration information for the uplink or downlink data transmission is the uplink or downlink scheduling grant information, the transmitting unit may transmit, after the at least one time domain symbol for the interference measurement, feedback information on terminating transmission of uplink or downlink shared channel within a scheduled time slot.

According to the exemplary embodiment, the transmitting unit may transmit uplink control information using the second sub frame structure, wherein in the second sub frame structure, the time domain symbol for transmitting the uplink control information is after the at least one time domain symbol for the interference measurement.

According to the exemplary embodiment, the uplink control information includes at least one of: necessary configuration information on grant-free transmission of uplink shared channel, necessary configuration information on grant-free transmission of downlink shared channel and feedback information on terminating the transmission of uplink or downlink shared channel within the scheduled time slot.

According to the exemplary embodiment, when the reference signal is the reference signal transmitted using the first sub frame structure, the time domain symbol for transmitting the reference signal included in the first sub frame structure and the time domain symbol for the interference measurement included in the second sub frame structure are the time domain symbol of a same index within a same time slot, wherein the time domain symbol for transmitting the reference signal in the first sub frame structure is before the time domain symbols used by the uplink or downlink data transmission.

According to the exemplary embodiment, the reference signal may include a front loaded reference signal transmitted by another terminal and/or a downlink reference signal transmitted by a base station, for another cell where the terminal is not located.

According to the exemplary embodiment, in the case where the reference signal is the front loaded reference signal transmitted by the another terminal, the configuration information acquisition unit may further acquire configuration information of the reference signal, wherein the interference measurement unit may receive the reference signal according to the configuration information of the reference signal, wherein the configuration information of the reference signal may include at least one of: sequence(s) of transmitting the reference signal, the number of time domain symbol(s) used for transmitting the reference signal or index(s) of the time domain symbol(s) used for transmitting the reference signal, a reference signal pattern, a bandwidth for transmitting the reference signal, and transmit power of the reference signal.

According to another aspect of the present disclosure, a data transmission method performed by a base station is provided, and the data transmission method includes: transmitting configuration information for uplink or downlink data transmission, wherein the configuration information at least includes information indicating whether a terminal transmits a front loaded reference signal; in response to the configuration information including the information indicating that the terminal transmits the reference signal, performing uplink data reception or downlink data transmission on time domain symbol(s) where the terminal transmits the reference signal or after the time domain symbol(s) where the terminal transmits the reference signal; and in response to the configuration information including the information indicating that the terminal does not transmit the reference signal, directly performing the uplink data reception or the downlink data transmission.

According to the exemplary embodiment, the data transmission method may further include: in response to the configuration information including the information indicating that the terminal transmits the reference signal, transmitting the configuration information of the reference signal, wherein the configuration information of the reference signal includes at least one of: sequence(s) of transmitting the reference signal, the number of time domain symbol(s) used for transmitting the reference signal or index(s) of the time domain symbol(s) used for transmitting the reference signal, a reference signal pattern, a bandwidth for transmitting the reference signal, and transmit power of the reference signal.

According to the exemplary embodiment, the data transmission method may further include: receiving uplink control information, wherein a starting time domain symbol for receiving the uplink control information is not earlier than a last time domain symbol where the terminal transmits the reference signal, and wherein the uplink control information at least includes essential information for grant-free transmission of uplink or downlink shared channel.

According to another aspect of the present disclosure, a data transmission method performed by a base station is provided, and the data transmission method may include: transmitting configuration information for uplink or downlink data transmission, wherein the configuration information at least includes information indicating whether physical resource(s) for a terminal to perform interference measurement are reserved; in response to the configuration information including the information indicating that the physical resource(s) for the terminal to perform the interference measurement are reserved, performing data transmission with the terminal after time domain symbol(s) where the terminal performs the interference measurement; and in response to the configuration information including the information indicating that the physical resource(s) for the terminal to perform the interference measurement are not reserved, directly performing the data transmission with the terminal.

According to the exemplary embodiment, the data transmission method may further include: receiving, after the time domain symbol(s) where the terminal performs the interference measurement, feedback information on terminating transmission of uplink or downlink shared channel within a scheduled time slot.

According to the exemplary embodiment, the data transmission method may further include: receiving uplink control information after the time domain symbol(s) where the terminal performs the interference measurement, wherein the uplink control information includes at least one of: necessary configuration information on grant-free transmission of uplink shared channel, necessary configuration information on grant-free transmission of downlink shared channel and feedback information on terminating the transmission of uplink or downlink shared channel within the scheduled time slot.

According to the exemplary embodiment, the data transmission method may further include: if the terminal receives the front loaded reference signal transmitted by another terminal on the time domain symbol(s) where the terminal performs the interference measurement, transmitting the configuration information of the reference signal to the terminal, wherein the configuration information of the reference signal includes at least one of: sequence(s) of transmitting the reference signal, the number of time domain symbol(s) used for transmitting the reference signal or index(s) of the time domain symbol(s) used for transmitting the reference signal, a reference signal pattern, a bandwidth for transmitting the reference signal, and transmit power of the reference signal.

According to another aspect of the present disclosure, a base station is provided, and the base station may include: a configuration information transmitting unit configured to transmit configuration information for uplink or downlink data transmission, wherein the configuration information at least includes information indicating whether a terminal transmits a front loaded reference signal; and a transmitting unit configured to: in response to the configuration information including the information indicating that the terminal transmits the reference signal, perform uplink data reception or downlink data transmission on time domain symbol(s) where the terminal transmits the reference signal or after the time domain symbol(s) where the terminal transmits the reference signal; and in response to the configuration information including the information indicating that the terminal does not transmit the reference signal, directly perform the uplink data reception or the downlink data transmission.

According to the exemplary embodiment, the transmitting unit may be further configured to: in response to the configuration information including the information indicating that the terminal transmits the reference signal, transmit the configuration information of the reference signal, wherein the configuration information of the reference signal includes at least one of: sequence(s) of transmitting the reference signal, the number of time domain symbol(s) used for transmitting the reference signal or index(es) of the time domain symbol(s) used for transmitting the reference signal, a reference signal pattern, a bandwidth for transmitting the reference signal, and transmit power of the reference signal.

According to the exemplary embodiment, the transmitting unit may be further configured to: receive uplink control information, wherein a starting time domain symbol for receiving the uplink control information is not earlier than a last time domain symbol where the terminal transmits the reference signal, and wherein the uplink control information at least includes essential information for grant-free transmission of uplink or downlink shared channel.

According to another aspect of the present disclosure, a base station is provided, and the base station may include: a configuration information transmitting unit configured to transmit configuration information for uplink or downlink data transmission, wherein the configuration information at least includes information indicating whether physical resource(s) for a terminal to perform interference measurement are reserved; and a transmitting unit configured to: in response to the configuration information including the information indicating that the physical resource(s) for the terminal to perform the interference measurement are reserved, perform data transmission with the terminal after time domain symbol(s) where the terminal performs the interference measurement; and in response to the configuration information including the information indicating that the physical resource(s) for the terminal to perform the interference measurement are not reserved, directly perform the data transmission with the terminal.

According to the exemplary embodiment, the transmitting unit may be further configured to: receive, after the time domain symbol(s) where the terminal performs the interference measurement, feedback information on terminating transmission of uplink or downlink shared channel within a scheduled time slot.

According to the exemplary embodiment, the transmitting unit may be further configured to: receive the uplink control information after the time domain symbol(s) where the terminal performs the interference measurement, wherein the uplink control information includes at least one of: necessary configuration information on grant-free transmission of uplink shared channel, necessary configuration information on grant-free transmission of downlink shared channel and feedback information on terminating the transmission of uplink or downlink shared channel within the scheduled time slot.

The data transmission method according to the present disclosure may support the terminal to transmit the reference signal before the data transmission or at the same time when the data transmission starts, and enable another terminal to measure a magnitude of the cross-link interference according to the reference signal and determine whether to perform the data transmission according to the magnitude of the interference. Such a data transmission method may effectively resolve the problem of the cross-link interference between terminals in the full-duplex system.

According to the power headroom report method, the terminal supporting the power headroom report, the configuration method executed by the base station and the base station of the present disclosure, the terminal is allowed to perform capability information report, and report power headroom according to the report condition corresponding to the capability information, such that the base station can control the transmit power of the terminal according to the information that the terminal reports, thereby reducing link transmission loss.

The power control method and device according to the exemplary embodiments of the present disclosure can adapt to the power adjustment requirements of different transmission types when the scheduling result for the UE may be switched dynamically between full-duplex transmission and half-duplex transmission.

Other aspects and/or advantages of an overall concept of the present disclosure will be partially illustrated in the following description, and in part will be clarified through description or implementation of the overall concept of the present disclosure.

Advantageous Effects of Invention

According to various exemplary embodiments of the present disclosure may resolve the problem on cross-link interference between terminals by the full-duplex transmission based on scheduling.

BRIEF DESCRIPTION OF DRAWINGS

The above and other targets and characteristics of exemplary embodiments of the present disclosure will become apparent from the following description, taken in conjunction with the accompanying drawings illustrating embodiments by means of examples, in which:

FIG. 1 is a flow chart diagram illustrating a data transmission method performed by a terminal according to an exemplary embodiment of the present application;

FIG. 2 is a diagram illustrating a sub frame structure A according to the exemplary embodiment of the present application;

FIG. 3 is a diagram illustrating a physical mapping manner of a reference signal and a mapping manner of a physical resource of downlink data transmission according to the exemplary embodiment of the present application;

FIG. 4 illustrates an example of the sub frame structure A for grant-free transmission;

FIG. 5 is a diagram illustrating a method for processing an overlapping phenomenon according to the exemplary embodiment of the present application;

FIG. 6 is a block diagram illustrating configuration of the terminal according to the exemplary embodiment of the present application;

FIG. 7 is a flow chart diagram illustrating a data transmission method performed by a terminal according to another exemplary embodiment of the present application;

FIG. 8 is a diagram illustrating a sub frame structure B according to another exemplary embodiment of the present application;

FIG. 9 illustrates an example of the sub frame structure B for grant-free transmission;

FIG. 10 is a block diagram illustrating configuration of the terminal according to another exemplary embodiment of the present application;

FIG. 11 is a flow chart diagram illustrating a data transmission method performed by a base station according to another exemplary embodiment of the present application;

FIG. 12 is a block diagram illustrating configuration of the base station according to another exemplary embodiment of the present application;

FIG. 13 is a flow chart diagram illustrating a data transmission method performed by the base station according to another exemplary embodiment of the present application;

FIG. 14 is a block diagram illustrating configuration of the base station according to another exemplary embodiment of the present application;

FIG. 15 illustrates a flow chart of a power headroom report method in accordance with an exemplary embodiment of the present disclosure;

FIG. 16 illustrates a block diagram of a terminal supporting power headroom report in accordance with an exemplary embodiment of the present disclosure;

FIG. 17 illustrates a flow chart of a configuration method executed by a base station in accordance with an exemplary embodiment of the present disclosure; and FIG. 18 illustrates a block diagram of a base station in accordance with an exemplary embodiment of the present disclosure.

FIG. 19 is a flowchart illustrating a power control method according to an exemplary embodiment of the present disclosure;

FIG. 20 is a flowchart illustrating a parameter configuration method for power control according to an exemplary embodiment of the present disclosure;

FIG. 21 is a block diagram illustrating a UE according to an exemplary embodiment of the present disclosure; and FIG. 22 is a block diagram illustrating a base station according to an exemplary embodiment of the present disclosure.

MODE FOR THE INVENTION

Embodiments of the present disclosure are now referred to in detail, examples of which are illustrated in the drawings. The embodiments will be explained below by referring to the accompany drawings, so as to explain the present disclosure.

In the following description, the same reference numerals are used for the same elements even in different drawings. The matters defined in the description, such as detailed construction and elements, are provided to assist in a comprehensive understanding of the exemplary embodiments. Therefore, it is clear that the exemplary embodiments can be carried out without those specifically defined matters. In addition, well-known functions or constructions may not be described in details since they may obscure the present disclosure with unnecessary details.

Before undergoing the description of the embodiments of the present disclosure, in order to facilitate understanding, the definitions of some terms adopted in the present disclosure will be briefly explained first.

The uplink transmission type may refer to a transmission type of the uplink physical channel/uplink physical signal, and the two items may be used interchangeably.

The transmission type may include full-duplex transmission or non full-duplex transmission.

The definition of full-duplex transmission at least includes one of: the same UE transmitting an uplink physical channel/uplink physical signal and receiving a downlink physical channel/downlink physical signal on the same time and frequency resources, and different UEs transmitting the uplink physical channel/uplink physical signal and receiving the downlink physical channel/downlink physical signal on the same time and frequency resources, respectively.

The definition of non full-duplex transmission at least includes one of time division duplexing, frequency division duplexing, full-duplex frequency division duplexing, and half-duplex frequency division duplexing.

The physical channel at least includes one of Physical Uplink Share Channel, Physical Uplink Control Channel and Physical Random Access Channel.

The physical signal at least includes one of an uplink demodulation reference signal, and an (uplink) probe reference signal.

Rapid growth of the mobile data services, especially exponential growth of High Definition (HD) video services and ultra HD video services, puts forward higher requirements for a transmission rate of wireless communication. In order to meet growing demands for mobile services, new technologies need to be developed on the basis of the 4G or the 5G so as to further improve transmission rate and throughput of a wireless communication system. A full duplex technology may further improve spectrum utilization based on a current wireless communication system, which is different from a traditional half duplex system that performs a time domain orthogonal division (for example, Time Division Duplexing (TDD)) or a frequency domain orthogonal division (for example, Frequency Division Duplexing (TDD)) for an uplink and a downlink, and a full duplex system allows an uplink and a downlink of a user to simultaneously perform transmitting at a time domain and a frequency domain, and thus, the full duplex system may theoretically achieve twice throughput of the half duplex system.

However, the uplink and the downlink are at the same time and have the same frequency, a transmitted signal of the same full duplex device in the full duplex system may generate a strong self-interference signal with respect to a receiving signal while performing full duplex transmission, and intensity of the self-interference signal may be even 120 dB or more higher than a bottom noise, and thus in order to enable the full duplex system to stably work, it is necessary to design a solution to eliminate the self-interference signal, such that the intensity of the self-interference signal is at least reduced to the same level as that of the bottom noise.

At present, there are several methods concerning elimination of the self-interference signal, including a passive elimination method, an analog elimination method, a digital-assistance analog elimination method, a digital elimination method and the like, and multiple self-interference signal elimination methods may be generally used together in the full duplex system during a practical application. However, even if the receiving signal is enabled to pass through a series of self-interference signal elimination modules, completely eliminating the self-interference signals cannot be ensured. That is, the receiving signal of the full duplex device is always mingled with a residual self-interference signal. This means that it is necessary to consider influence of residual self-interference signal in a design of the full duplex system.

An effective way to reduce the residual self-interference signal is to reduce the transmission power of the full duplex device. When the considered full duplex device is a base station, the base station may adjust a downlink transmission power according to its own ability to eliminate the self- $$P_{PUSCHb,f,c}(i, j, q_d, l) = \min\begin{Bmatrix} P_{CMAX,f,c}(i), \\ P_{O\_PUSCHb,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{Bmatrix} \quad (1)$$

[dBm].

interference signal. A current communication protocol (for example, Long Term Evolution of the 3rd Generation Partner Program (3GPP LTE) and New Radio of the 3rd Generation Partner Program (3GPP NR)) may support this operation. When the considered full duplex device is a full duplex terminal, transmit power of the full duplex terminal is jointly decided by an open loop power control and a closed loop power control, wherein the power of the open loop power control is obtained in the following way: path loss is calculated according to a downlink reference signal by a terminal, a target receiving power configured by the base station is compensated with respect to the path loss according to the calculated path loss, and the target receiving power after being compensated is the power of the open loop power control; the power of the closed loop power control is configured by the base station, for example, the base station configures a scheduled uplink physical signal or an uplink physical channel by transmitting a power command, to increase or decrease a certain amount of power based on the current transmission power. On the premise that the residual self-interference signal in the receiving signal of the full duplex terminal is unknown to the base station, the closed loop power control for the terminal may adjust an uplink transmission power of the terminal to be higher, thereby resulting in the residual self-interference signal existing in the receiving signal of the terminal working under a full duplex mode, so as to affect a downlink receiving performance of the terminal.

A current terminal may report power headroom and a maximum transmission power of the terminal working under a non-full duplex mode to a base station through a power headroom report mechanism, as a basis of configuring a Transmitter Power Control command (TPC command) by the base station.

However, an existing power headroom report method does not consider a situation where a terminal may switch between a non-full duplex mode and a full duplex mode. That is, the existing power headroom report method cannot report corresponding power headroom according to an ability of the terminal supporting the full duplex. In this case, the base station cannot control the transmit power of the terminal according to the ability of the terminal and power headroom corresponding to the ability of the terminal while determining an transmit power control command of the closed loop power control to perform power control, so that the residual self-interference signal existing in the receiving signal of the terminal cannot be effectively eliminated, thereby causing link transmission loss.

In a traditional half-duplex 4G system, the power control method of the uplink physical channel (hereinafter referred to as power control) is called closed-loop power control. Expression (1) of the transmit power of Physical Uplink Share Channel (PUSCH) is given below (for the specific definition of each parameter in the Expression (1), please refer to "3*GPP TS* 38.213*: 'NR; Physical layer procedure for control* (*Release* 15)'", and specific explanations of some parameters will be given in combination with the embodiments later):

In uplink power control, the transmit power of physical channel can be viewed as a sum of two main items, that is: an operating point of the open-loop transmit power calculated from transmit power parameters semi-statically configured by the base station and a path loss measured by a UE (specifically, the first three items $P_{o\_PUSCHb,f,c}(j)$, $10 \log_{10}(2^\mu \cdot M_{RB,b,f,c}^{PUSCH}(i))$ and $\alpha_{b,f,c}(j) \cdot PL(q_d)$ in the PUSCH transmit power expression (1)); and a close-loop transmit power portion dynamically configured by the base station. The close-loop transmit power portion dynamically configured by the base station includes another two items, that is: power adjustment item related to modulation and coding mode (specifically, the fourth item $\Delta_{TF,b,f,c}(i)$ in PUSCH transmit power expression (1)); and a Transmit Power Control (TPC) command transmitted through scheduling authorization information by the base station (which can be reflected by the fifth item $f_{b,f,c}(i,l)$ in the PUSCH transmit power expression (1)). The UE may increase or decrease the transmit power of PUSCH according to an indication of the TPC command.

The current protocol supports two TPC modes: an accumulated TPC mode and an absolute TPC mode. The accumulated TPC mode means adding a power adjustment value obtained based on the TPC command received by the UE on the previous power adjustment value, to form the power adjustment value required in the current uplink physical channel/uplink physical signal transmit power calculation formula. The absolute TPC mode means using the power adjustment value obtained based on the TPC command received by the UE to form the power adjustment value required in the current uplink physical channel/uplink physical signal transmit power calculation formula. Compared with the absolute TPC mode, the accumulated TPC mode can achieve an adjustment with relatively small power steps and more precise closed-loop power control. The absolute TPC mode can realize an adjustment with relatively large power steps, but due to the limitation of the number of TPC indication field bits, it is unable to achieve more precise power control than the accumulated TPC mode. In the existing system, the absolute TPC mode is generally more suitable for the UE to carry out the power control of non-continuous transmission or intermittent transmission, while the accumulated TPC mode is generally more suitable for the UE to carry out the power control of continuous transmission. The continuous or non-continuous transmission performed by the UE is determined by types of UE services, which usually does not change dynamically. Therefore, the TPC mode in the current protocol adopts the user-specific quasi-static configuration mode.

For the full-duplex system, it is assumed that both the UE and the base station have the ability to operate in the full-duplex mode. Given that the uplink and downlink services of the same UE have different arrival time, the uplink and downlink traffics may also be asymmetric. Therefore, a situation where full-duplex transmission and half-duplex transmission are dynamically alternated may occur even when a UE having full-duplex communication capability is scheduled by the base station. As analyzed above, the received signal will be interfered by the residual self-interference signal only when the UE performs the full-duplex transmission. This means that when the UE dynamically switches between full-duplex transmission and half-duplex transmission, the interference environment on the UE side as a receiving end is different, so the requirements for the transmitted signal power will also be different. At this time, assuming that the UE is configured with the accumulated TPC mode, the power adjustment amplitude may not meet the transmit power requirements for switching between the full-duplex transmission and half-duplex transmission. Thus, a better power adjustment scheme is needed for achieving this uplink transmission mode of the full-duplex system.

There is another unique interference in the full-duplex system. In the same cell, when a base station schedules uplink transmission of a terminal and downlink transmission of another terminal simultaneously on the same time domain and frequency domain resources, the downlink terminal will receive an uplink signal transmitted by the uplink terminal while performing the downlink reception, and such an interference is referred to as cross-link interference. In a system using time division duplex, similar cross-link interference may also occur when configurations of uplink and downlink sub frames of neighboring cells are different. A difference from cross-link interference in a time division duplex system lies in that cross-link interference in the full-duplex system is mainly intra-cell interference, while cross-link interference in the time division duplex system is inter-cell interference. Processing methods for the intra-cell interference and the inter-cell interference are different. Generally, a static coordination method is used for the coordination of the intra-cell interference, while the inter-cell interference may be processed by a dynamic method such as scheduling and the like, for example, the base station may perform scheduling based on locating information of a user, pair terminals with long distance, and perform uplink transmission and downlink transmission on the same time and frequency resources, respectively. However, unfortunately, the user's location information may merely reflect a magnitude of the cross-link interference indirectly, and the scheduling based on the user's location may not effectively resolve the problem of the cross-link interference. Since the cross-link interference may be only measured at a terminal and may be generated only after the completion of the scheduling, a base station cannot obtain a measurement result of the cross-link interference between any two terminals, and this means that the full-duplex transmission based on scheduling may not resolve the problem on cross-link interference between terminals better.

FIG. 1 is a flow chart diagram illustrating a data transmission method performed by a terminal according to an exemplary embodiment of the present application.

Referring to FIG. 1, in step S110, the terminal acquires configuration information for uplink or downlink data transmission. Specifically, in the step S110, the terminal may acquire uplink or downlink scheduling grant information or uplink or downlink semi-persistent scheduling configuration information, and acquire the configuration information for the uplink or downlink data transmission through the uplink or downlink scheduling grant information or the uplink or downlink semi-persistent scheduling configuration information. For example, the acquired configuration information may at least include time domain and frequency domain physical resource information, power control information and the like, and the configuration information may be carried by, for example, the uplink or downlink scheduling grant information or the uplink or downlink semi-persistent scheduling configuration information, and so on.

Subsequently, in step S120, the terminal may determine whether a front loaded reference signal is transmitted according to the acquired configuration information. The transmitting of the front loaded reference signal means transmitting the reference signal on one or more time domain symbols before a time domain physical resource indicated by the configuration information of the uplink or downlink data transmission. As an example, the front loaded reference signal may be a reference signal for measuring cross-link interference. Specifically, in the step S120, the terminal may determine whether the reference signal is transmitted according to indication information in the uplink or downlink scheduling grant information or the uplink or downlink semi-persistent scheduling configuration information included in the configuration information. For example, the indication information may be a 1-bit indication field in the scheduling grant information or semi-persistent scheduling information, which may indicate whether the reference signal is transmitted. Or, the indication information may further be configuration information of a physical resource of the reference signal in the uplink or downlink scheduling grant information or the uplink or downlink semi-persistent scheduling information. Alternatively, in the step S120, the terminal may further determine whether the reference signal is transmitted according to information related to physical resource(s) for the uplink or downlink data transmission acquired through the uplink or downlink scheduling grant information or the uplink or downlink semi-persistent scheduling configuration information. For example, when a physical resource block and/or a time domain symbol/time slot of the data transmission is a semi-persistent scheduling physical resource block and/or a time domain symbol/time slot for transmission in different directions reserved by a system (base station), or when the physical resource block and the time domain symbol/time slot of the data transmission are resources configured by the system (base station) to allow full-duplex transmission (that is, the uplink and downlink data is allowed to be transmitted on a same physical resource element), it is determined that the reference signal is transmitted.

In response to determining that the reference signal is transmitted, in step S130, the terminal transmits the reference signal before the data transmission or at the same time when the data transmission starts and performs uplink data transmission or downlink data reception. Otherwise, in response to determining that the reference signal is not transmitted, in step S140, the terminal directly performs the uplink data transmission or the downlink data reception.

Specifically, in the step S130, the terminal may acquire the configuration information of the reference signal, and transmit the reference signal according to the configuration information of the reference signal. Here, as an example, the configuration information of the reference signal may include, but is not limited to, at least one of sequence(s) of transmitting the reference signal, the number of time domain symbol(s) used for transmitting the reference signal or index(s) of the time domain symbol(s) used for transmitting the reference signal, a reference signal pattern, a bandwidth for transmitting the reference signal, and transmit power of the reference signal. In addition, a specific method for the terminal to acquire the configuration information of the reference signal may be that the configuration information of the reference signal is acquired through the indication information, or be fixed by a protocol, or implicitly acquired according to a system rule. For example, the sequence of transmitting the reference signal by the terminal may be: a cell-specific sequence, which is obtained through calculation by the terminal according to a cell identification code; or a sequence fixed by a protocol is adopted, such as an all 1 sequence and the like. The transmit power for the terminal to transmit the reference signal (that is, the transmit power of the reference signal) may be configuration of a power value acquired by the terminal through a cell-level signaling, or transmit power of the reference signal fixed by a protocol, such as maximum transmit power of the terminal. The time domain symbol(s) where the terminal transmits the reference signal may be acquired by the terminal through an indication in the scheduling grant information or semi-persistent scheduling information of the data transmission, for example, the time domain symbol(s) where the terminal transmits the reference signal may be continuous N time domain symbols from a starting time domain symbol of the data transmission, wherein a value of N may be acquired by the terminal through the indication in the scheduling grant information or semi-persistent scheduling information of the data transmission. Or, the time domain symbol(s) where the terminal transmits the reference signal may be acquired by the terminal through an indication of the cell-specific signaling, for example, the time domain symbol(s) where the terminal transmits the reference signal may be continuous N time domain symbols from the starting time domain symbol of the data transmission, wherein the value of N may be acquired by the terminal through the indication of the cell-specific signaling. Or, the time domain symbol(s) where the terminal transmits the reference signal may be fixed by a protocol, for example, the time domain symbol(s) where the terminal transmits the reference signal may be continuous N time domain symbols from the starting time domain symbol of the data transmission, wherein the value of N may be fixed by the protocol. The pattern of the reference signal (or referred to as a reference signal density) transmitted by the terminal may be acquired by the terminal through user-specific or user group specific signaling, or fixed by the protocol. Through an indication of the reference signal pattern, the terminal may acquire specific position(s) of a physical resource element(s) to which the reference signal is mapped, for example, an example of the reference signal pattern (density) may be the reference signal is mapped onto continuous physical resource elements of a subcarrier on a same time domain symbol. The bandwidth for transmitting the reference signal by the terminal may be determined by the terminal according to a bandwidth of the data transmission, for example, the bandwidth for transmitting the reference signal by the terminal may be a bandwidth of the uplink or downlink data transmission, or the bandwidth for transmitting the reference signal by the terminal may be a bandwidth of the reference signal acquired by the terminal according to bandwidth configuration reserved by the system, and the bandwidth configuration reserved by the system may be a bandwidth reserved for the semi-persistent scheduling.

In addition, according to the exemplary embodiment of the present application, in the step S130, the terminal may transmit the reference signal using a first sub frame structure (hereinafter, it is referred to as a sub frame structure A for convenience of description), wherein at least one time domain symbol for transmitting the reference signal is included in the first sub frame structure. Here, if the terminal transmits the reference signal before the data transmission, the at least one time domain symbol may be previous to time domain symbols used by the uplink or downlink data transmission, and if the terminal transmits the reference signal at the same time when the data transmission starts, the at least one time domain symbol is first several time domain symbols used by the uplink or downlink data transmission.

In the present application, the reference signal transmitted by the terminal may be used by another terminal to measure the cross-link interference. Moreover, the number of the time domain symbols used for transmitting the reference signal by the terminal may be preset by the system, or notified through a high-level signaling.

FIG. 2 illustrates an example of the sub frame structure A by taking a time slot with a regular cyclic prefix [3GPP TS 38.211: "NR; Physical channels and modulation (Release 15)"] as an example. In FIG. 2, it is supposed that the number of the time domain symbols used for transmitting the reference signal by the terminal is 1, a plurality of time domain symbols may also be used to transmit the above reference signal in practical application, however.

In the example of FIG. 2, it is supposed that the terminal firstly transmits the reference signal at the starting of the transmission, and then performs downlink or uplink transmission, that is to say, the terminal transmits the reference signal before the data transmission. However, the terminal may also transmit the reference signal at the same time when the data transmission starts. In addition, the at least one time domain symbol for transmitting the reference signal may be aligned with a boundary of the time slot (as shown in FIG. 2(*a*)), or not aligned with the boundary of the time slot, for example, starting from a certain time domain symbol in the time slot (as shown in FIG. 2(*b*)). In other words, a transmission starting location may be aligned with the boundary of the time slot (as shown in FIG. 2(*a*)), or may start from a certain time domain symbol in the time slot (as shown in FIG. 2(*b*)). Here, the transmission starting location may be acquired by the terminal through a downlink control signaling or acquired through the high-level signaling.

As stated above, the terminal may transmit the reference signal at the same time when the data transmission starts. For example, the time domain symbol(s) where the terminal transmits the reference signal in the sub frame structure A may be time domain symbol(s) for downlink transmission at the same time, for example, the terminal transmits the reference signal on a first time domain symbol, and receives downlink data from the first time domain symbol in the time slot at the same time. If the reference signal is transmitted at the same time when the data transmission starts, physical resource element(s) for transmitting the reference signal and physical resource element(s) for the data transmission are the physical resource elements of different subcarriers on the same time domain symbol, or the physical resource element(s) for transmitting the reference signal and the physical resource element(s) for the data transmission are the same physical resource element(s).

FIG. 3 illustrate a diagram of a physical mapping manner of the reference signal and a mapping manner of a physical resource of downlink data transmission according to an exemplary embodiment of the present application. For example, as shown in FIG. 3(*a*), the physical mapping manner of the reference signal transmitted by the terminal and the mapping manner of the physical resource of the downlink data transmission may be the physical resource element(s) for transmitting the reference signal by the terminal and the physical resource element(s) for the downlink transmission being the physical resource elements of the different subcarriers on the same time domain symbol. Or, as shown in FIG. 3(b), the physical resource element(s) for transmitting the reference signal by the terminal and the physical resource element(s) for the downlink transmission are the same element(s). It should be explained that FIG. 3(a) provides an example of a mapping pattern when the physical resource element(s) for transmitting the reference signal by the terminal and the physical resource element(s) for the downlink transmission are the physical resource elements of the different subcarriers on the same time domain symbol, however, the mapping pattern may be fixed by a protocol in the practice and is not limited to the pattern shown in the above example.

According to the exemplary embodiment, the data transmission method of FIG. 1 may further include transmitting uplink control information using the first sub frame structure. Here, a starting time domain symbol for transmitting the uplink control information may be not earlier than a last time domain symbol for transmitting the reference signal, and the uplink control information may at least include essential information for grant-free transmission of uplink or downlink shared channel, such as a physical resource indication of the data transmission, a modulation coding manner of the data transmission, a power control command and the like. The terminal may implement the grant-free transmission by transmitting the uplink control information.

FIG. 4 illustrates an example of the sub frame structure A for the grant-free transmission. Specifically, FIGS. 4(a) and 4(b) provide examples of grant-free transmission of downlink shared channel and grant-free transmission of uplink shared channel, respectively, wherein it is supposed that the number of the time domain symbols in the time slot is 15, the number of the time domain symbols used by the terminal to transmit the reference signal is 1, the number of the time domain symbols used for transmitting the uplink control information is 3, and the number of the time domain symbols used for the downlink/uplink data transmission (the downlink shared channel transmission or the transmission of uplink shared channel in FIG. 4) is 11. It should be explained that: in practice, allocation of the number of the time domain symbols for different functions in the time slot may be set according to needs, and is not limited to the above examples.

According to the exemplary embodiment, timing advance for transmitting the reference signal by the terminal and the timing advance for transmitting the uplink data may be different. Here, the uplink data may be an uplink physical signal transmitted by the terminal and received by a base station. For example, the timing advance for transmitting the reference signal by the terminal may be zero, that is, the reference signal is transmitted according to a symbol boundary obtained by the terminal through downlink synchronization. Or, the terminal may acquire the timing advance for transmitting the reference signal through a configuration signaling, wherein the configuration signaling for configuring the timing advance for transmitting the reference signal and the configuration signaling for configuring the timing advance for transmitting the uplink data by the terminal may be different. For example, the terminal may acquire the timing advance for transmitting the reference signal through the high-level signaling, or acquire the timing advance for transmitting the reference signal through a control element (CE) of medium access control (MAC). The MAC CE used by the terminal to acquire the timing advance for transmitting the reference signal and the MAC CE used by the terminal to acquire the timing advance for transmitting the uplink data may be different. When the timing advance for transmitting the reference signal by the terminal is less than the timing advance for transmitting the uplink data by the terminal and the time domain symbol for transmitting the reference signal by the terminal and the time domain symbol for transmitting the uplink data by the terminal are adjacent to each other, an overlapping phenomenon of the time domain signals may occur, that is, a starting signal of the uplink data is transmitted before an end signal of the reference signal is transmitted. When the phenomenon occurs, it needs to process the method of the terminal to transmit the reference signal or transmit the uplink data.

FIG. 5 is a diagram illustrating a method for processing the overlapping phenomenon according to the exemplary embodiment of the present application. Specifically, according to the exemplary embodiment, when the timing advance for transmitting the reference signal is less than the timing advance for transmitting the uplink data and the time domain symbol for transmitting the reference signal and the time domain symbol for transmitting the uplink data are adjacent to each other, time domain signals before a time domain termination location at which the reference signal is transmitted, among time domain signals of the uplink data are not transmitted while the uplink data transmission is performed, or the time domain signal after a time domain starting location of the uplink data, among time domain signals of the reference signal is not transmitted while the reference signal is transmitted.

The data transmission method according to the exemplary embodiment of the present application have been described with reference to FIG. 1 to FIG. 5, and the data transmission method may transmit the front loaded reference signal, and enable another terminal to measure a magnitude of the interference according to the reference signal and determine whether to perform the data transmission according to the magnitude of the interference accordingly.

Hereinafter, the terminal according to the exemplary embodiment of the present application (i.e., the terminal for performing the data transmission method of FIG. 1) will be described with reference to FIG. 6.

FIG. 6 is a block diagram illustrating configuration of the terminal (it will be referred to as a terminal 600 for convenience of description) according to the exemplary embodiment of the present application. Referring to FIG. 6, the terminal 600 may include a configuration information acquisition unit 610, a determination unit 620 and a transmitting unit 630, but is not limited hereto.

Specifically speaking, the configuration information acquisition unit 610 may be configured to acquire configuration information for uplink or downlink data transmission. For example, the configuration information acquisition unit 610 may acquire uplink or downlink scheduling grant information or uplink or downlink semi-persistent scheduling configuration information, and acquire the configuration information for the uplink or downlink data transmission through the uplink or downlink scheduling grant information or the uplink or downlink semi-persistent scheduling configuration information.

The determination unit 620 may be configured to determine whether a front loaded reference signal is transmitted according to the acquired configuration information. For example, the front loaded reference signal may be a reference signal for measuring cross-link interference. Specifically, the determination unit 620 may determine whether the reference signal is transmitted according to indication information in the uplink or downlink scheduling grant information or the uplink or downlink semi-persistent scheduling configuration information included in the configuration information. Or, the determination unit 620 may determine whether the reference signal is transmitted according to information related to physical resource(s) for the uplink or downlink data transmission acquired through the uplink or downlink scheduling grant information or the uplink or downlink semi-persistent scheduling configuration information.

The transmitting unit 630 may be configured to: in response to determining that the reference signal is transmitted, transmit the reference signal before the data transmission or at the same time when the data transmission starts and perform uplink data transmission or downlink data reception, and in response to determining that the reference signal is not transmitted, directly perform the uplink data transmission or the downlink data reception. As an example, the transmitting unit 630 may acquire the configuration information of the reference signal, and transmit the reference signal according to the configuration information of the reference signal. As an example, the configuration information of the reference signal may include at least one of, but is not limited hereto: sequence(s) of transmitting the reference signal, the number of time domain symbol(s) used for transmitting the reference signal or index(es) of the time domain symbol(s) used for transmitting the reference signal, a reference signal pattern, a bandwidth for transmitting the reference signal, and transmit power of the reference signal. The configuration information has been illustrated in the depiction related to FIG. 1 above, which will not be repeated here again.

According to the exemplary embodiment, the transmitting unit 630 may use the above-described sub frame structure A to transmit the reference signal. Here, at least one time domain symbol for transmitting the reference signal is included in the sub frame structure A, and in addition, if the reference signal is transmitted before the data transmission, the at least one time domain symbol is previous to time domain symbols used by the uplink or downlink data transmission, and if the reference signal is transmitted at the same time when the data transmission starts, the at least one time domain symbol is first several time domain symbols used by the uplink or downlink data transmission. In the present application, the at least one time domain symbol may be aligned with a boundary of the time slot, or not aligned with the boundary of the time slot.

As stated above, the transmitting unit 630 may transmit the reference signal at the same time when the data transmission starts. Here, if the transmitting unit transmits the reference signal at the same time when the data transmission starts, physical resource element(s) for transmitting the reference signal and physical resource element(s) for the data transmission are the physical resource elements of different subcarriers on the same time domain symbol, or the physical resource element(s) for transmitting the reference signal and the physical resource element(s) for the data transmission are the same physical resource element(s).

According to the exemplary embodiment, in order to perform grant-free transmission, the transmitting unit may be further configured to: transmit uplink control information using the first sub frame structure, wherein a starting time domain symbol for transmitting the uplink control information is not earlier than a last time domain symbol for transmitting the reference signal. Here, the uplink control information may at least include essential information for grant-free transmission of uplink or downlink shared channel.

In addition, in the present application, timing advance for transmitting the reference signal by the transmitting unit 630 and the timing advance for transmitting the uplink data may be different. When the timing advance for transmitting the reference signal is less than the timing advance for transmitting the uplink data and the time domain symbol for transmitting the reference signal and the time domain symbol for transmitting the uplink data are adjacent to each other, the overlapping phenomenon of time domain symbols may occur, and in this case, the transmitting unit 630 may not transmit time domain signals before a time domain termination location at which the reference signal is transmitted, among time domain signals of the uplink data while the uplink data transmission is performed, or may not transmit the time domain signal after a time domain starting location of the uplink data, among time domain signals of the reference signal while the reference signal is transmitted.

The terminal 600 described with reference to FIG. 6 may perform the data transmission method described with reference to FIG. 1. Thus, any depiction related to the sub frame structure A, the configuration information for the uplink or downlink transmission, the configuration information of the reference signal and so on with reference to FIG. 1 to FIG. 5 are applicable to FIG. 6, which will not repeated here again. As stated above, the terminal 600 according to the exemplary embodiment may transmit the front loaded reference signal, and enable another terminal to measure a magnitude of the interference (such as cross-link interference) according to the reference signal and determine whether to perform the data transmission according to the magnitude of the interference accordingly, thereby effectively resolving the cross-link interference problem existing in the full-duplex system, for example.

FIG. 7 is a flow chart diagram illustrating a data transmission method performed by a terminal according to another exemplary embodiment of the present application.

Referring to FIG. 7, in step S710, the terminal may acquire configuration information for uplink or downlink data transmission. Here, the configuration information for the uplink or downlink data transmission may include uplink or downlink scheduling grant information, or uplink or downlink semi-persistent scheduling configuration information, but is not limited hereto. In addition, the depiction on the configuration information for the uplink or downlink data transmission as described with reference to FIG. 1 is also applicable here, which will not be repeated here again.

In step S720, the terminal may perform interference measurement before the data transmission. As an example, in the step S720, the terminal may receive a reference signal for the interference measurement, and perform the interference measurement according to the reference signal. Here, the reference signal may include a front loaded reference signal transmitted by another terminal (such as a reference signal for measuring the cross-link interference) and/or a downlink reference signal transmitted by a base station, for another cell where the terminal is not located. When the received reference signal includes the front loaded reference signal transmitted by the above-described terminal of FIG. 6 (such as a reference signal transmitted using the sub frame structure A), the terminal may measure the cross-link interference according to the reference signal. When the received reference signal includes the downlink reference signal transmitted by the base station, for the other cell where the terminal is not located, the terminal may measure the inter-cell interference according to the reference signal.

Specifically, in the step S720, the terminal may use a second sub frame structure (below, the second sub frame structure here is referred to as a sub frame structure B for convenience of description) to receive the reference signal.

Hereinafter, the sub frame structure B may be briefly described with reference to FIG. 8. FIG. 8 is a diagram illustrating the sub frame structure B according to another exemplary embodiment of the present application. As shown in FIG. 8, an example of the sub frame structure B is also illustrated by taking a time slot with a regular cyclic prefix [3GPP TS 38.211: "NR; Physical channels and modulation (Release 15)"] as an example. In FIG. 8, it is supposed that the number of the time domain symbols used for interference measurement by the terminal in the sub frame structure B is 1, however, the time domain symbol for interference measurement by the terminal may also be a plurality of time domain symbols in practical application. That is to say, at least one time domain symbol for the interference measurement is included in the sub frame structure B, and in addition, the at least one time domain symbol is previous to time domain symbols used by the uplink or downlink data transmission, wherein the reference signal for the interference measurement is received on the at least one time domain symbol.

When receiving the front loaded reference signal transmitted by the other terminal, the terminal may acquire the configuration information of the reference signal, and receive the reference signal according to the configuration information of the reference signal. Here, the configuration information of the reference signal may include, but is not limited to, at least one of sequence(s) of transmitting the reference signal, the number of time domain symbol(s) used for transmitting the reference signal or index(es) of the time domain symbol(s) used for transmitting the reference signal, a reference signal pattern, a bandwidth for transmitting the reference signal, and transmit power of the reference signal. Please refer to the above detailed depiction with reference to FIG. 1 for the specific explanation of the above configuration information and the method for acquiring the configuration information of the reference signal, which will not be repeated here again.

Particularly, when the reference signal received on the at least one time domain symbol is the reference signal transmitted using the first sub frame structure (the above-described sub frame structure A) described in the present application, the time domain symbol for transmitting the reference signal included in the sub frame structure A and the time domain symbol for the interference measurement included in the sub frame structure B may be the time domain symbol of a same index within a same time slot, and such a design may ensure the terminal receives the reference signal for the interference measurement within a correct receiving window.

Hereinafter, in step S730, according to a result of the interference measurement, the terminal may perform an operation of: performing the data transmission according to the acquired configuration information for the uplink or downlink data transmission, or not performing the data transmission. As an example, the terminal may compare the measured interference with a preset interference threshold, and in response to the measured interference being less than the preset interference threshold, the terminal may perform the data transmission according to the acquired configuration information for the uplink or downlink data transmission. Otherwise, in response to the measured interference being not less than the preset interference threshold, the terminal may not perform the data transmission.

Specifically, the not performing of the data transmission may be: not performing uplink data transmission or downlink data reception on physical resource(s) indicated by the configuration information for the uplink or downlink data transmission, in addition to receiving the reference signal on the at least one time domain symbol for the interference measurement. If the configuration information for the uplink or downlink data transmission is the uplink or downlink scheduling grant information, the not performing of the data transmission may include: transmitting, after the at least one time domain symbol for the interference measurement, feedback information on terminating transmission of uplink or downlink shared channel within a scheduled time slot (as shown in FIG. 9c which will be described below, uplink control information may be transmitted after the time domain symbol for the interference measurement, and in this case, the uplink control information includes the feedback information on terminating the transmission of uplink or downlink shared channel within the scheduled time slot).

Here, a physical resource used for transmitting the uplink feedback information may include a time domain resource, a frequency domain resource and the like, and may be acquired by the terminal through the uplink/downlink scheduling grant information of the data transmission, or acquired by the terminal through the high-level signaling.

In addition, according to another exemplary embodiment of the present application, the data transmission method described in FIG. 7 may further include: transmitting the uplink control information using the sub frame structure B. Here, in the sub frame structure B, the time domain symbol for transmitting the uplink control information is after the at least one time domain symbol for the interference measurement.

As an example, the uplink control information here may include at least one of: necessary configuration information on grant-free transmission of uplink shared channel (such as a physical resource indication, a scheduling coding manner, a power control command and the so on), necessary configuration information on grant-free transmission of downlink shared channel and feedback information on terminating the transmission of uplink or downlink shared channel within the scheduled time slot.

The terminal may implement the grant-free transmission because of the transmission of the uplink control information. FIG. 9 illustrates an example of the sub frame structure B for the grant-free transmission. Specifically, FIG. 9(a) to FIG. 9(c) provide three examples of the sub frame structure B for the grant-free transmission. As an example, in FIG. 9(a) to FIG. 9(c), the time domain symbol for the interference measurement may be aligned with a boundary of the time slot, or not aligned with the boundary of the time slot. In addition, in FIG. 9(a) to FIG. 9(c), the time domain symbol for transmitting the uplink control information is after the time domain symbol for the interference measurement, and it is supposed that the number of the time domain symbols in the time slot is 15, the number of the time domain symbols used by the terminal to transmit the reference signal is 1, the number of the time domain symbols used for transmitting the uplink control information is 3, the number of the time domain symbols used for the downlink/uplink data transmission is 11. It should be explained that: in practice, allocation of the number of the time domain symbols for different functions in the time slot may be set according to needs, and is not limited to the example.

The data transmission method according to another exemplary embodiment of the present application have been described above, and according to the data transmission method, the terminal may perform the interference measurement before the data transmission and perform the corresponding data transmission according to the result of the interference measurement, for example, the terminal may receive the reference signal for the interference measurement, measure the interference according to the received reference signal, and perform the data transmission only when the interference is less than the preset threshold. Thus, it is possible to effectively avoid data transmission interference and improve communication quality.

Hereinafter, the terminal according to another exemplary embodiment of the present application (i.e., the terminal for performing the data transmission method of FIG. 7) will be described with reference to FIG. 10.

FIG. 10 is a block diagram illustrating configuration of the terminal (it will be referred to as the terminal 1000 for convenience of description) according to another exemplary embodiment of the present application. Referring to FIG. 10, the terminal 1000 may include a configuration information acquisition unit 1010, an interference measurement unit 1020 and a transmitting unit 1030, but is not limited hereto.

Specifically speaking, the configuration information acquisition unit 1010 may be configured to acquire configuration information for uplink or downlink data transmission. Here, the configuration information for the uplink or downlink data transmission may include, but is not limited to: uplink or downlink scheduling grant information, or uplink or downlink semi-persistent scheduling configuration information.

The interference measurement unit 1020 may be configured to perform the interference measurement before the data transmission. As an example, the interference measurement unit 1020 may receive a reference signal for the interference measurement and perform the interference measurement according to the reference signal. Here, the reference signal may include a front loaded reference signal transmitted by another terminal and/or a downlink reference signal transmitted by a base station, for another cell where the terminal is not located. When the reference signal includes the front loaded reference signal (such as a reference signal for measuring cross-link interference transmitted by another terminal in the cell where the terminal is located, the interference measurement unit 1020 may measure the cross-link interference within the cell; and when the reference signal includes the downlink reference signal for the other cell where the terminal is not located, the interference measurement unit 1020 may measure the interference between the cell where the terminal is located and the other cell (i.e., the inter-cell interference).

In the case where the reference signal is the front loaded reference signal transmitted by the other terminal, the configuration information acquisition unit 1010 may be further configured to acquire configuration information of the reference signal, and the interference measurement unit 1020 may receive the reference signal according to the acquired configuration information of the reference signal. Here, the configuration information of the reference signal may include, but is not limited to, at least one of sequence(s) of transmitting the reference signal, the number of time domain symbol(s) used for transmitting the reference signal or index(s) of the time domain symbol(s) used for transmitting the reference signal, a reference signal pattern, a bandwidth for transmitting the reference signal, and transmit power of the reference signal.

As an example, the interference measurement unit 1020 may use the above-described sub frame structure B to receive the reference signal. At least one time domain symbol for the interference measurement is included in the sub frame structure B, and the at least one time domain symbol is previous to time domain symbols used by the uplink or downlink data transmission, wherein the reference signal for the interference measurement is received on the at least one time domain symbol.

As stated above, the reference signal for the interference measurement may be the front loaded reference signal transmitted by the other terminal, for example, may be a reference signal for measuring the cross-link interference transmitted by the other terminal in the cell where the terminal 1000 is located using the sub frame structure A. When the reference signal received on the at least one time domain symbol is the reference signal transmitted using the above-described sub frame structure A, the time domain symbol for transmitting the reference signal included in the sub frame structure B and the time domain symbol for the interference measurement included in the sub frame structure A may be the time domain symbol of a same index within a same time slot, wherein the time domain symbol for transmitting the reference signal in the sub frame structure A is before the time domain symbols used by the uplink or downlink data transmission.

The transmitting unit 1030 may be configured to, according to a result of the interference measurement, perform an operation of: performing the data transmission according to the acquired configuration information for the uplink or downlink data transmission, or not performing the data transmission. As an example, the transmitting unit 1030 may compare the measured interference with a preset interference threshold, and in response to the measured interference being less than the preset interference threshold, the transmitting unit 1030 may perform the data transmission according to the acquired configuration information for the uplink or downlink data transmission. However, in response to the measured interference being not less than the preset interference threshold, the transmitting unit 1030 may not perform the data transmission.

Specifically, if the data transmission is not performed, the transmitting unit 1030 may not perform uplink data transmission or downlink data reception on physical resource(s) indicated by the configuration information for the uplink or downlink data transmission, in addition to receiving the reference signal on the at least one time domain symbol for the interference measurement. If the configuration information for the uplink or downlink data transmission is the uplink or downlink scheduling grant information, the transmitting unit 1030 may transmit, after the at least one time domain symbol for the interference measurement, feedback information on terminating transmission of uplink or downlink shared channel within a scheduled time slot (as shown in FIG. 9(c) described above).

As an example, the transmitting unit 1030 may further transmit the uplink control information using the sub frame structure B, wherein in the sub frame structure B, the time domain symbol for transmitting the uplink control information is after the at least one time domain symbol for the interference measurement. As an example, the uplink control information may include, but is not limited to, at least one of necessary configuration information on grant-free transmission of uplink shared channel, necessary configuration information on grant-free transmission of downlink shared channel and feedback information on terminating the transmission of uplink or downlink shared channel within the scheduled time slot. As stated above, in the case where the configuration information for the uplink or downlink data transmission is the uplink or downlink scheduling grant information, the feedback information on terminating the transmission of uplink or downlink shared channel within the scheduled time slot transmitted by the transmitting unit 1030 after the at least one time domain symbol for the interference measurement is a kind of the uplink control information. The transmission of the uplink control information enables the terminal 1000 to implement the grant-free data transmission.

The terminal 1000 according to the exemplary embodiment may perform the interference measurement before the data transmission and select to perform the data transmission or not perform the data transmission according to the result of the interference measurement, for example, the terminal 1000 may receive the reference signal for the interference measurement, measure the interference according to the received reference signal, and perform the data transmission only when the interference is less than the preset threshold. Thus, it is possible to effectively avoid the data transmission interference, thereby improving the communication quality.

FIG. 11 is a flow chart diagram illustrating a data transmission method performed by a base station according to another exemplary embodiment of the present application.

Referring to FIG. 11, in step S1110, the base station may acquire configuration information for uplink or downlink data transmission. Here, the configuration information may at least include information indicating whether a terminal transmits a front loaded reference signal. In step S1120, in response to the transmitted configuration information including the information indicating that the terminal transmits the reference signal, the base station may perform uplink data reception or downlink data transmission on time domain symbol(s) where the terminal transmits the reference signal or after the time domain symbol(s) where the terminal transmits the reference signal. However, in step S1130, in response to the transmitted configuration information including the information indicating that the terminal does not transmit the reference signal, the base station may directly perform the uplink data reception or the downlink data transmission. In addition, although it is not shown in FIG. 11, the data transmission method performed by the base station may further include an operation of: in response to the configuration information including the information indicating that the terminal transmits the reference signal, transmitting the configuration information of the reference signal. As an example, the configuration information of the reference signal may include at least one of: sequence(s) of transmitting the reference signal, the number of time domain symbol(s) used for transmitting the reference signal or index(s) of the time domain symbol(s) used for transmitting the reference signal, a reference signal pattern, a bandwidth for transmitting the reference signal, and transmit power of the reference signal. In addition, the data transmission method performed by the base station as shown in FIG. 11 may further include: receiving uplink control information. Here, a starting time domain symbol for receiving the uplink control information is not earlier than a last time domain symbol for transmitting the reference signal by the terminal, and the uplink control information may at least include essential information for grant-free transmission of uplink or downlink shared channel.

FIG. 12 is a block diagram illustrating configuration of the base station according to another exemplary embodiment of the present application.

A base station 1200 shown in FIG. 12 performs the data transmission method of FIG. 11. Specifically, referring to FIG. 12, the base station 1200 may include a configuration information transmitting unit 1210 and a transmitting unit 1220. The configuration information transmitting unit 1210 may transmit configuration information for uplink or downlink data transmission. Here, the configuration information may at least include information indicating whether a terminal transmits a front loaded reference signal. The transmitting unit 1220 may perform operations of: in response to the configuration information including the information indicating that the terminal transmits the reference signal, performing uplink data reception or downlink data transmission on time domain symbol(s) where the terminal transmits the reference signal or after the time domain symbol(s) where the terminal transmits the reference signal; and in response to the configuration information including the information indicating that the terminal does not transmit the reference signal, directly performing the uplink data reception or the downlink data transmission. In addition to performing the above operations, the transmitting unit 1220 may, in response to the configuration information including the information indicating that the terminal transmits the reference signal, transmit the configuration information of the reference signal. For example, the configuration information of the reference signal may include at least one of: sequence(s) of transmitting the reference signal, the number of time domain symbol(s) used for transmitting the reference signal or index(s) of the time domain symbol(s) used for transmitting the reference signal, a reference signal pattern, a bandwidth for transmitting the reference signal, and transmit power of the reference signal. In addition, the transmitting unit 1220 may receive the uplink control information from the terminal. Specifically, a starting time domain symbol for receiving the uplink control information may be not earlier than a last time domain symbol for transmitting the reference signal by the terminal. Here, the uplink control information may at least include essential information for grant-free transmission of uplink or downlink shared channel.

FIG. 13 is a flow chart diagram illustrating a data transmission method performed by the base station according to another exemplary embodiment of the present application.

Referring to FIG. 13, in step S1310, the base station may transmit configuration information for uplink or downlink data transmission. Here, the configuration information may at least include information indicating whether physical resource(s) for a terminal to perform interference measurement are reserved. In step S1320, in response to the configuration information including the information indicating that the physical resource(s) for the terminal to perform the interference measurement are reserved, the base station may perform data transmission with the terminal after time domain symbol(s) where the terminal performs the interference measurement. In step S1330, in response to the configuration information including the information indicating that the physical resource(s) for the terminal to perform the interference measurement are not reserved, the base station may directly perform the data transmission with the terminal. In addition, although it is not shown in FIG. 13, the data transmission method of FIG. 13 may further include a step of: receiving, after the time domain symbol(s) where the terminal performs the interference measurement, feedback information on terminating transmission of uplink or downlink shared channel within a scheduled time slot. In addition, the data transmission method of FIG. 13 may further include a step of: receiving uplink control information after the time domain symbol(s) where the terminal performs the interference measurement. Here, the uplink control information may include at least one of: necessary configuration information on grant-free transmission of uplink shared channel, necessary configuration information on grant-free transmission of downlink shared channel and feedback information on terminating the transmission of uplink or downlink shared channel within the scheduled time slot. In addition, the data transmission method performed by the base station in FIG. 13 may further include a step of: if the terminal receives the front loaded reference signal transmitted by another terminal on the time domain symbol for the interference measurement, transmitting the configuration information of the reference signal to the terminal. For example, the configuration information of the reference signal may include at least one of: sequence(s) of transmitting the reference signal, the number of time domain symbol(s) used for transmitting the reference signal or index(s) of the time domain symbol(s) used for transmitting the reference signal, a reference signal pattern, a bandwidth for transmitting the reference signal, and transmit power of the reference signal.

FIG. 14 is a block diagram illustrating configuration of the base station according to another exemplary embodiment of the present application.

The base station shown in FIG. 14 performs the data transmission method of FIG. 13. Referring to FIG. 14, the base station 1400 may include a configuration information transmitting unit 1410 and a transmitting unit 1420. Specifically, the configuration information transmitting unit 1410 may transmit configuration information for uplink or downlink data transmission. Here, the configuration information may at least include information indicating whether physical resource(s) for a terminal to perform interference measurement are reserved. The transmitting unit 1420 may, in response to the configuration information including the information indicating that the physical resource(s) for the terminal to perform the interference measurement are reserved, perform data transmission with the terminal after time domain symbol(s) where the terminal performs the interference measurement; and the transmitting unit 1420 may, in response to the configuration information including the information indicating that the physical resource(s) for the terminal to perform the interference measurement are not reserved, directly perform the data transmission with the terminal. In addition, the transmitting unit 1420 may further receive, after the time domain symbol(s) where the terminal performs the interference measurement, feedback information on terminating transmission of uplink or downlink shared channel within a scheduled time slot. As described above with reference to FIG. 7, when a terminal 700 does not perform the data transmission with the base station according to the result of the interference measurement the terminal 700 may transmit, after the time domain symbol for the interference measurement, the feedback information on terminating the transmission of uplink or downlink shared channel within the scheduled time slot. In addition, the transmitting unit 1420 may receive uplink control information after the time domain symbol(s) where the terminal performs the interference measurement. Specifically, the uplink control information may include at least one of: necessary configuration information on grant-free transmission of uplink shared channel, necessary configuration information on grant-free transmission of downlink shared channel and feedback information on terminating the transmission of uplink or downlink shared channel within the scheduled time slot.

The data transmission method as well as the terminal and the base station for performing the data transmission method according to the embodiments of the present disclosure have been described above with reference to FIGS. 1 to 14. However, it should be understood that respective units in the terminal as shown in FIGS. 6 and 10 and respective units of the base station as shown in FIGS. 12 and 14 may be configured as software, hardware, firmware or any combination thereof for performing a specific function. For example, these units may correspond to a special integrated circuit, or may correspond to pure software codes, and may further correspond to a module formed by combining software and hardware. As an example, the terminal described with reference to FIGS. 6 and 10 may be a PC computer, a tablet device, a personal digital assistant, a smart phone, a web application, or any other device capable of executing the above instructions, but is not limited hereto.

It should be explained that although the terminals 600 and 1000 and the base stations 1200 and 1400 are divided into corresponding units for performing corresponding processing respectively when they are described above, those skilled in the art understand that the processing executed by the respective unit may also be executed when the terminals and the base stations are not specifically divided into the units or there is no distinct demarcation between the respective units. In addition, the terminals described above with reference to FIGS. 6 and 10 and the base stations described with reference to FIGS. 12 and 14 all include but are not limited to the above-described units, and some other units (such as a memory unit, a data processing unit and the like) may be further added according to the needs, or the above units may also be combined.

In addition, the data transmission method according to the present disclosure may be recorded in a computer readable medium including program instructions executing various operations implemented by a computer. Examples of the computer readable medium may include a magnetic medium (for example, a hard disk, a floppy disk, and a magnetic tape); an optical medium (for example, a CD-ROM and DVD); a magneto-optical media (for example, a CD); and a specially prepared hardware device (for example, a ROM, a RAM, a flash memory and the like) for storing and executing program instructions. The examples of the program instructions include, for example, machine codes generated by a compiler, and a file including advanced codes that may be executed by a computer through using an interpreter. In addition, some operations in the data transmission method according to the exemplary embodiments of the present application may be implemented through a manner of software, some operations may be implemented through a manner of hardware, and besides, these operations may be implemented by a manner of combining the software and the hardware.

FIG. 15 illustrates a flow chart of a power headroom report method in accordance with an exemplary embodiment of the present disclosure.

As illustrated in FIG. 15, the power headroom report method includes steps 1510 and 1520. In step 1510, capability information is reported, wherein the capability information includes: information indicating whether a terminal supports full duplex. In step 1520, power headroom is reported according to a report condition corresponding to the capability information. The power headroom report method may be executed by a terminal supporting the power headroom report.

The terminal supporting the power headroom report includes any terminal supporting full duplex and/or non-full duplex, for example, a cellular phone, a tablet computer, an intelligent wearable device (for example, a wrist watch and virtual vision glasses), a personal computer, a personal digital assistant, an eBook Reader, smart home appliances and the like. The above terminals are only illustrative and are not used for limiting the scope of the present disclosure, and any other terminal supporting the full duplex and/or the non-full duplex is also implementable.

Here, the terminal supporting the full duplex means: the terminal transmits and receives a physical channel and/or a physical signal in the same time and frequency domains, wherein the transmitted physical channel or physical signal includes but is not limited to: a physical uplink shared channel, a physical uplink control channel, a physical random access channel, a detection reference signal, an uplink demodulation reference signal; the received physical channel or physical signal includes but is not limited to: a physical downlink shared channel, a physical downlink control channel, a physical broadcast channel, a channel status information reference signal, a positioning reference signal, a downlink demodulation reference signal, etc. In addition, the non-full duplex at least includes one of: time division duplex, frequency division duplex, full duplex frequency division duplex, and half duplex frequency division duplex.

As an example, step 1510 includes at least one of: carrying the capability information in an information element for capability information report; and reporting the capability information through a random access message.

As an example, the reporting the capability information through the random access message includes: transmitting a random access channel on predetermined physical resource, wherein the predetermined physical resource is associated with the capability information and includes at least one of: a specific random access signal sequence resource, specific time domain resource(s) for transmitting the random access channel, and specific frequency domain resource(s) for transmitting the random access channel. In the exemplary embodiments of the present disclosure, "specific" may indicate "predetermined", "designated", "pre-indicated" and the like.

As an example, whether the terminal supports the full duplex may be determined by at least one of: if the terminal selects the preamble sequence in the predetermined preamble sequence group for the random access channel, determining that the terminal supports the full duplex; and if the terminal transmits the random access channel on specific subcarrier(s) and/or specific physical resource block(s), determining that the terminal supports the full duplex, otherwise, when the terminal transmits the random access channel on a subcarrier other than the specific subcarrier(s) and/or physical resource block(s) other than the specific physical resource block, meaning that the terminal does not support the full duplex, that is, the terminal does not have a full duplex capability.

Specifically, the full duplex capability may means whether the terminal supports the full duplex, and the information indicating whether the terminal supports the full duplex may be called as full duplex capability information for short. The manner in which the terminal reports the full duplex capability information may include: the terminal carries the full duplex capability information in an information element for reporting the full duplex capability information.

As an example, the terminal may report the full duplex capability information in the uplink shared channel of a message (MsgA) in a two-step random access procedure or the uplink shared channel of a message (Msg3) in a four-step random access procedure, or the terminal transmits the random access channel using a physical resource which has an association with the full duplex capability of the terminal, to carry the full duplex capability information of the terminal. For example, the full duplex capability information is included in a radio resource control (RRC) connection establishment request that the Msg3 carries in the four-step random access procedure.

As an example, when the report condition includes whether an indication of full duplex mode power headroom report for the terminal is obtained, step 1520 includes: reporting the full duplex mode power headroom when the indication is obtained. The indication may be transmitted to the terminal by the base station; specifically, when the base station receives the capability information that the terminal reports, and the reported capability information includes the information indicating that the terminal supports the full duplex, it determines that the current terminal supports the full duplex. In this case, the indication may be transmitted to the terminal so as to indicate that the terminal may report the full duplex mode power headroom.

As an example, when the report condition includes the report situation of the capability information, step 1520 includes: reporting full duplex mode power headroom when the report of the capability information is accomplished and the capability information includes information indicating that the terminal supports a full duplex mode.

As an example, when the report condition includes an association between a bandwidth or a bandwidth part configured according to the capability information and a duplex mode, step 1520 includes: reporting full duplex mode power headroom when the frequency domain resource(s) allocated to the terminal for transmission is located in a bandwidth or a bandwidth part associated with the full duplex.

Specifically, the report condition may be associated with a high-layer signaling sent by the base station after receiving the capability information, that is, the terminal may obtain an indication in the high-layer signaling (for example, a high-layer signaling from the base station) to notify the terminal to report the full duplex mode power headroom, wherein the high-layer signaling may include a relevant parameter configured to a single terminal, a cell or a cell group and for notifying the terminal of reporting the full duplex mode power headroom. In this case, if the terminal supports the full duplex mode, the terminal may report the full duplex mode power headroom. A high-layer signaling configured for a single terminal may be a user dedicated signaling, and the high-layer signaling configured for multiple terminals (for example, in a cell or a cell group) may be a user group dedicated signaling. If the terminal obtains the user dedicated signaling or user group dedicated signaling, and the obtained signaling includes the relevant parameter for notifying the terminal of reporting the full duplex mode power headroom, the terminal reports the full duplex mode power headroom, otherwise, if the obtained signaling does not include the relevant parameter for notifying the terminal of reporting the full duplex mode power headroom for example, the terminal performs non-full duplex power headroom report.

The high-layer signaling may carry downlink control information. In this case, when the terminal obtains the indication of full duplex mode power headroom report for the terminal in the downlink control information, the terminal reports the full duplex mode power headroom. Specifically, the terminal may obtain downlink control information that carries an uplink authorization. If the downlink control information that carries the uplink authorization includes an indication to notify the terminal of reporting the full duplex mode power headroom, the terminal reports the full duplex mode power headroom through the uplink shared channel that is scheduled at this time, for example, carrying full duplex mode power headroom in the uplink shared channel.

The report condition may also be associated with the report situation of the capability information, that is, if the terminal accomplishes the capability report, and the reported capability information includes the information indicating that the terminal supports the full duplex mode, the terminal reports the full duplex mode power headroom; otherwise, that is, any one of accomplishing, by the terminal, the capability report and reporting the capability information which includes the information indicating that the terminal supports the full duplex mode is not successful, the terminal reports the non-full duplex mode power headroom.

The report condition may also be determined according to a bandwidth or a bandwidth part currently configured to the terminal, that is, there is an association between the bandwidth or bandwidth part configured to the terminal and the duplex mode. When the bandwidth or the bandwidth part corresponds to the full duplex mode, the full duplex mode power headroom is reported. When the bandwidth or the bandwidth part corresponds to the non-full duplex mode, the non-full duplex mode power headroom is reported. Specifically, the configured bandwidth or bandwidth part may be an uplink and/or downlink bandwidth or bandwidth part currently activated by the terminal. For example, if the bandwidth or bandwidth part obtained by the terminal (that is, the bandwidth or bandwidth part configured to the terminal) supports the terminal to perform full duplex mode transmission, then the terminal reports the full duplex mode power headroom; otherwise, for example, if the bandwidth or bandwidth part obtained by the terminal only supports the terminal to perform non-full duplex mode transmission, then the terminal reports non-full duplex mode power headroom.

As an example, at step 1520, the full duplex mode power headroom and/or the non-full duplex mode power headroom may be reported. The reporting the full duplex mode power headroom includes reporting the power headroom of the terminal working under the full duplex mode, the maximum transmit power of the terminal working under the full duplex mode, the power headroom of the terminal working under the non-full duplex mode and the maximum transmit power of the terminal working under the non-full duplex mode; and/or reporting the power headroom of the terminal working under the non-full duplex mode, the maximum transmit power of the terminal working under the non-full duplex mode, the offset between the power headroom of the terminal working under the full duplex mode and the power headroom of the terminal working under the non-full duplex mode, and the offset between the maximum transmit power of the terminal working under the full duplex mode and the maximum transmit power of the terminal working under the non-full duplex mode.

As an example, the reporting the non-full duplex mode power headroom includes reporting the power headroom of the terminal working under the non-full duplex mode, and the maximum transmit power of the terminal working under the non-full duplex mode; and/or reporting the power headroom of the terminal working under the full duplex mode, the maximum transmit power of the terminal working under the full duplex mode, the offset between the power headroom of the terminal working under the full duplex mode and the power headroom of the terminal working under the non-full duplex mode, and the offset between the maximum transmit power of the terminal working under the full duplex mode and the maximum transmit power of the terminal working under the non-full duplex mode.

The power headroom of the terminal working under the non-full duplex mode includes but is not limited to: Type 1 power headroom, Type 2 power headroom, and Type 3 power headroom, and the definitions for the three types of power headroom may refer to the *literature 3GPP, TS*38.321, *"NR; Medium Access Control (MAC) protocol specification (Release* 15)"; the maximum transmit power of the terminal working under the non-full duplex mode includes: the maximum value of the transmit power configured to the terminal, and the definition of the maximum transmit power may refer to a literature 3*GPP, TS*38.213, *"NR: Physical layer procedures for control (Release* 15)".

As an example, the power headroom may be reported through media access control (MAC) control elements (CE), wherein each control element includes fields and one of: the power headroom of the terminal working under the full duplex mode; the maximum transmit power of the terminal working under the full duplex mode; the offset between the power headroom of the terminal working under the full duplex mode and the power headroom of the terminal working under the non-full duplex mode; and the offset between the maximum transmit power of the terminal working under the full duplex mode and the maximum transmit power of the terminal working under the non-full duplex mode, wherein the indication field indicates the one.

A procedure of reporting the power headroom based on a control element of medium access control (MAC) is described hereinafter with reference to Tables 1 to 4.

In the embodiment illustrated by Table 1, the content that the terminal reports can be: the power headroom of the terminal working under the non-full duplex mode, the maximum transmit power of the terminal working under the non-full duplex mode, and the offset between the maximum transmit power of the terminal working under the full duplex mode and the maximum transmit power of the terminal working under the non-full duplex mode. The power headroom report of a single entry is performed based on the MAC CE, wherein one control element may be called as a single entry PHR MAC CE and may be defined as follows:

TABLE 1

| R | R | PH (Type 1, PCell) |
| R | $V_1$ | $P_{CMAX,f,c}$ |
| R | R | $\Delta P$ |

The single entry PHR MAC CE has a variable size, and the size can be two bytes or three bytes. When the size is three bytes, the single entry PHR MAC CE contains two fixed bytes and one byte for dynamic indication. In the single entry PHR MAC CE illustrated by Table 1: R is a reservation bit; PH is the power headroom, which particularly represents the power headroom in the non-full duplex mode, for example, the length of PH is set to be 6 bits, but the present disclosure may not be limited to this. PH may be the power headroom corresponding to a primary cell (PCell) or the power headroom corresponding to a secondary cell (SCell). PH represents the type of the power headroom, and the power headroom may be Type 1 power headroom, Type 2 power headroom, Type 3 power headroom and the like. Here, Type 1 is explained as an example, but the present disclosure may not be limited to this; $P_{CMAX,f,c}$ represents the maximum transmit power in the non-full duplex mode; $V_1$ is an indication domain indicating whether $\Delta P$ exists, and PHR MAC CE may not include the field $V_1$; in this case, the reservation bit may be placed at the position where $V_1$ is located, marked as R, and at this time, the size of the single entry PHR MAC CE is two bytes; and $\Delta P$ indicates that the offset between the maximum transmit power of the terminal working under the full duplex mode and the maximum transmit power of the terminal working under the non-full duplex mode.

In the exemplary embodiments of the present disclosure, a calculation equation of the maximum transmit power in the full duplex mode is illustrated as follows:

$$P_{FD\_CMAX,f,c} = P_{CMAX,f,c} + \Delta P$$

wherein $P_{FD\_CMAX,f,c}$ represents the maximum transmit power of the terminal working under the full duplex mode. Taking Type 1 power headroom as an example, power headroom $PH_{FD\_type1,b,f,c}(i,j,q_d,l)$ in the full duplex mode may be determined through the following equation:

$$PH_{FD\_type1,b,f,c}(i,j,q_d,l) = P_{FD\_CMAX,f,c}(i) - \{P_{O\_PUSCH,b,f,c}(j) + 10\log_{10}(2^\mu \cdot M_{RB,b,f,c}^{PUSCH}) + \alpha_{b,f,c}(j) \cdot PL_{b,f,c}(q_d) + \Delta_{TF,b,f,c}(i) + f_{b,f,c}(i,l)\}$$

The parameter descriptions other than $P_{FD\_CMAX,f,c}(i)$ in the equation may be referred in the related technology 3GPP, TS38.213, "NR: Physical layer procedures for control (Release 15)". Type 1 power headroom in the non-full duplex mode is used in the equation. In the exemplary embodiments of the present disclosure, the first item $P_{FD\_CMAX,f,c}(i)$ on the right side of the equal sign in the equation may represent the maximum transmit power in the full duplex mode, and the definition for the rest of parameters on the right side of the equal sign may be referred in the related technology. In other words, the power headroom in the full duplex mode that the terminal reports may be calculated through the following equation:

$$PH_{FD\_type1,b,f,c}(i,j,q_d,l) = PH_{type1,b,f,c}(i,j,q_d,l) + \Delta P$$

wherein $PH_{type1,b,f,c}(i,j,q_d,l)$ represents the power headroom of the terminal working under the non-full duplex mode, $PH_{type1,b,f,c}(i,j,q_d,l)$ and $\Delta P$ are the contents that the terminal directly reports through the PHR MAC CE and represent the power headroom of the terminal working under the full duplex mode and the offset between the power headroom of the terminal working under the non-full duplex mode and the power headroom of the terminal working under the full duplex mode, respectively. Reporting multiple-entry PHR MAC CE may be implemented with reference to the embodiments, which will not be repeated herein.

In the embodiment illustrated by Table 2, the specific content that the terminal reports may be the power headroom of the terminal working under the non-full duplex mode, the maximum transmit power of the terminal working under the non-full duplex mode, and the power headroom of the terminal working under the full duplex mode. In one exemplary embodiment, a single entry PHR MAC CE may be defined as follows:

TABLE 2

| R | R | PH (Type 1, PCell) |
| R | $V_1$ | $P_{CMAX,f,c}$ |
| R | R | $PH_{FD}$(Type 1, PCell) |

The single entry PHR MAC CE has a variable size, the size can be two bytes or three bytes, and the single entry PHR MAC CE contains two fixed bytes and one byte for dynamic indication. In the single entry PHR MAC CE illustrated by Table 2: R is the reservation bit; PH represents the power headroom in the non-full duplex mode, for example, the length of PH is set to be 6 bits, but the present disclosure may not be limited to this. PH may be the power headroom corresponding to the PCell or the power headroom corresponding to the SCell. The type of power headroom that PH represents may be Type 1 power headroom, Type 2 power headroom, Type 3 power headroom and the like. Here, Type 1 power headroom corresponding to the PCell is explained; $PH_{FD}$ represents the power headroom of the terminal working under the full duplex mode. The calculation equation of $PH_{FD}$ may be obtained with reference to the literature cited above; $P_{CMAX,f,c}$ indicates the maximum transmit power of the terminal working under the non-full duplex mode; $V_1$ is an indication domain indicating whether $PH_{FD}$ exists, PHR MAC CE may not include the field $V_1$; in this case, the reservation bit may be placed at the position where $V_1$ is located, marked as R; at this time, the size of the single entry PHR MAC CE is two bytes. Similarly, reporting the multiple-entry PHR MAC CE may be implemented with reference to the embodiments, which will not be repeated herein.

In the embodiment illustrated by Table 3, the specific content that the terminal reports may be the power headroom of the terminal working under the non-full duplex mode, the maximum transmit power of the terminal working under the non-full duplex mode, and the maximum transmit power of the terminal working under the full duplex mode. In one exemplary embodiment, the single entry PHR MAC CE may be defined as follows:

TABLE 3

| R | R | PH (Type 1, PCell) |
| R | $V_1$ | $P_{CMAX,f,c}$ |
| R | R | $P_{FD\_CMAX,f,c}$ |

The single entry PHR MAC CE has a variable size, and the size can be two bytes or three bytes, and the single entry PHR MAC CE contains two fixed bytes and one byte for dynamic indication. In the single entry PHR MAC CE illustrated by Table 3: R is the reservation bit; PH represents the power headroom in the non-full duplex mode, for example, the length of PH is set to be 6 bits, but the present disclosure may not be limited to this. PH may be the power headroom corresponding to the PCell or the power headroom corresponding to the SCell. The type of power headroom that PH represents may be Type 1 power headroom, Type 2 power headroom, Type 3 power headroom and the like. Here, Type 1 power headroom corresponding to the PCell is explained; $P_{CMAX,f,c}$ indicates the maximum transmit power of the terminal working under the non-full duplex mode, and $P_{FD\_CMAX,f,c}$ indicates the maximum transmit power of the terminal working under the full duplex mode; $V_1$ is the indication domain indicating whether $P_{FD\_CMAX,f,c}$ exists; and the PHR MAC CE may not include the field $V_1$, and in this case, the reservation bit may be placed at the position where $V_1$ is located, marked as R. At this time, the size of the single entry PHR MAC CE is two bytes.

The calculation equation of the power headroom $PH_{FD\_type1,b,f,c}(i,j,q_d,l)$ in the full duplex mode may be understood with reference to the above literature. In the present embodiment, the calculation equation of the power headroom is changed into:

$$PH_{FD\_type1,b,f,c}(i,j,q_d,l) = PH_{type1,b,f,c}(i,j,q_d,l) + (P_{FD\_CMAX,f,c}(i) - P_{CMAX,f,c}(i))$$

wherein $PH_{type1,b,f,c}(i,j,q_d,l)$ represents the power headroom of the terminal working under the non-full duplex mode, $P_{FD\_CMAX,f,c}(i)$ is the maximum transmit power of the terminal working under the full duplex mode, $P_{CMAX,f,c}(i)$ is the maximum transmit power of the terminal working under the non-full duplex mode. Similarly, reporting the multiple-entry PHR MAC CE may be implemented with reference to the embodiments, which will not be repeated herein.

In the embodiment illustrated by Table 4, the specific content that the terminal reports may be the power headroom of the terminal working under the non-full duplex mode, the maximum transmit power of the terminal working under the non-full duplex mode, the power headroom of the terminal working under the full duplex mode, and the maximum transmit power of the terminal working under the full duplex mode. In one exemplary embodiment, a single entry PHR MAC CE may be defined as follows:

TABLE 4

| R | R | PH (Type 1, PCell) |
| R | $V_1$ | $P_{CMAX,f,c}$ |
| R | R | $PH_{FD}$(Type 1, PCell) |
| R | R | $P_{FD\_CMAX,f,c}$ |

The single entry PHR MAC CE has a variable size, the size may be two bytes or three bytes, and the single entry PHR MAC CE contains two fixed bytes and one byte for dynamic indication. In the single entry PHR MAC CE illustrated by Table 4: R is the reservation bit; PH represents the power headroom in the non-full duplex mode, for example, the length of PH is set to be 6 bits, but the present disclosure may not be limited to this. PH may be the power headroom corresponding to the PCell or the power headroom corresponding to the SCell. The type of power headroom that PH represents may be Type 1 power headroom, Type 2 power headroom, Type 3 power headroom and the like. Here, Type 1 power headroom corresponding to the PCell is explained. $P_{CMAX,f,c}$ indicates the maximum transmit power of the terminal working under the non-full duplex mode; $P_{FD\_CMAX,f,c}$ indicates the maximum transmit power of the terminal working under the full duplex mode; $V_1$ is an indication domain indicating whether $PH_{FD}$(Type 1, PCell) and $P_{FD\_CMAX,f,c}$ exists; the PHR MAC CE may not include the field $V_1$, and in this case, the reservation bit may be placed at the position where $V_1$ is located, marked as R; and at this time, the size of the single entry PHR MAC CE is two bytes. Similarly, reporting the multiple-entry PHR MAC CE may be implemented with reference to the embodiments, which will not be repeated herein.

FIG. 16 illustrates a block diagram of a terminal supporting power headroom report in accordance with an exemplary embodiment of the present disclosure.

As shown in FIG. 16, the terminal includes: a capability information report unit 1610 configured to report capability information; and a power headroom report unit 1620 configured to report power headroom according to a report condition corresponding to the capability information, wherein the capability information includes information indicating whether the terminal supports full duplex.

As an example, the capability information report unit 1610 carries the capability information in an information element for capability information report, and/or reports the capability information through the random access message.

Alternatively, the capability information report unit 1610 reports the capability information through one of: transmitting a random access channel on predetermined physical resource; reporting the capability information in an uplink shared channel of MsgA in a two-step random access procedure; reporting the capability information in an uplink shared channel of Msg3 in a four-step random access procedure, wherein the predetermined physical resource is associated with the capability information and includes at least one of: predetermined random access preamble sequence(s); predetermined time domain resource(s) for transmitting a random access channel; and predetermined frequency domain resource(s) for transmitting a random access channel.

Alternatively, the terminal further includes: a capability determination unit (not shown) configured to if the terminal selects the preamble sequence in the predetermined preamble sequence group for the random access channel, determine that the terminal supports the full duplex; and/or if the terminal transmits the random access channel on predetermined subcarrier(s) and/or predetermined physical resource block(s), determine that the terminal supports the full duplex.

Alternatively, the report condition includes: whether an indication of full duplex mode power headroom report for the terminal is obtained, and the power headroom report unit 1620 reports the full duplex mode power headroom when the indication is obtained.

Alternatively, the report condition includes: the report situation of the capability information, wherein the power headroom report unit 1620 reports the full duplex mode power headroom when the report of the capability information is accomplished and the capability information includes information indicating that the terminal supports the full duplex.

Alternatively, the report condition includes: an association between a bandwidth or a bandwidth part, which is configured according to the capability information, and a duplex mode, wherein the power headroom report unit 1620 reports the full duplex mode power headroom when the frequency domain resource(s) allocated to the terminal for transmission is located in a bandwidth or a bandwidth part associated with full duplex.

Alternatively, the power headroom report unit 1620 reports the full duplex mode power headroom and/or reports the non-full duplex mode power headroom, wherein the power headroom report unit 1620 reports, while reporting the full duplex mode power headroom, at least one of: the power headroom of the terminal working under the full duplex mode, the maximum transmit power of the terminal working under the full duplex mode, the power headroom of the terminal working under the non-full duplex mode, and the maximum transmit power of the terminal working under the non-full duplex mode; the power headroom of the terminal working under the non-full duplex mode, the maximum transmit power of the terminal working under the non-full duplex mode, the offset between the power headroom of the terminal working under the full duplex mode and the power headroom of the terminal working under the non-full duplex mode, and the offset between the maximum transmit power of the terminal working under the full duplex mode and the maximum transmit power of the terminal working under the non-full duplex mode.

Alternatively, the power headroom report unit 1620 reports the power headroom through the control element of the media access control, wherein each control element includes an indication field and one of: the power headroom of the terminal working under the full duplex mode; the maximum transmit power of the terminal working under the full duplex mode; the offset between the power headroom of the terminal working under the full duplex mode and the power headroom of the terminal working under the non-full duplex mode; and the offset between the maximum transmit power of the terminal working under the full duplex mode and the maximum transmit power of the terminal working under the non-full duplex mode, and wherein the indication field indicating the one.

It should be understood that the detailed examples of the terminal supporting the power headroom report in accordance with exemplary embodiments of the present disclosure may be implemented by reference to related detailed implementation described in FIG. 15 and are not repeated herein.

FIG. 17 illustrates a flow chart of a configuration method executed by a base station in accordance with an exemplary embodiment of the present disclosure.

As illustrated in FIG. 17, the capability information is received at step 1710; configuration is performed according to the received capability information at step 1720. Here, step 1720 includes at least one of: transmitting an indication of full duplex mode power headroom report for the terminal according to the capability information; transmitting the reception feedback with respect to the capability information; and configuring a bandwidth for the terminal according to the capability information, wherein the capability information includes: information indicating whether the terminal supports the full duplex.

FIG. 18 illustrates a block diagram of a base station in accordance with an exemplary embodiment of the present disclosure. As illustrated in FIG. 18, the base station in accordance with the exemplary embodiment of the present disclosure includes a capability information receiving unit 1810 configured to receive capability information; a configuration unit 1820 configured to perform configuration according to the received capability information, wherein the configuration performed by the configuration unit 1820 includes at least one of: transmitting an indication of full duplex mode power headroom report for the terminal according to the capability information; transmitting the reception feedback with respect to the capability information; and configuring a bandwidth for the terminal according to the capability information, wherein the capability information includes: information indicating whether the terminal supports the full duplex.

According to the present disclosure, the capability information and the power headroom corresponding to the capability information may be reported, so that the base station may transmit a corresponding control instruction according to the capability information and the power headroom corresponding to the capability information of the terminal, to effectively configure the transmit power of the terminal, thereby effectively eliminating the self-interference signal and reducing link transmission loss.

In accordance with another exemplary embodiment of the present disclosure, a system including at least one computing device and at least one storage device for storing instructions is provided, wherein the instruction enables the at least one computing device to perform the method as described above when being operated by the at least one computing device.

In accordance with another exemplary embodiment of the present disclosure, a computer readable storage medium storing an instruction is provided, wherein the instruction enables at least one computing device to perform the method as described above when being operated by the at least one computing device.

FIG. 19 is a flowchart illustrating a power control method according to an exemplary embodiment of the present disclosure.

Referring to FIG. 19, at step 1910, a UE may determine an uplink transmission type of current scheduling, and determine an uplink power control parameter configuration scheme based on the uplink transmission type of the current scheduling.

In an exemplary embodiment of the present disclosure, one of the ways for the UE to determine the uplink transmission type may be acquiring a signaling indication on the transmission type of uplink physical channel/uplink physical signal. For example, the UE may acquire indication information indicating that the transmission type of uplink physical channel/uplink physical signal of the current scheduling is one of {full-duplex transmission, non full-duplex transmission} through downlink control information. Or, the UE may acquire indication information indicating that the transmission type of a determined physical channel/physical signal of the UE is one of {full-duplex transmission, non full-duplex transmission} through user-specific signaling. In this way, the determined physical channel may be Physical Uplink Share Channel or Physical Random Access Channel for example, the determined physical signal may be an uplink probe reference signal. Or, the UE may also acquire indication information indicating that the transmission type of physical channel/physical signal within system bandwidth/configured bandwidth is one of {full-duplex transmission, non full-duplex transmission} through cell-specific signaling.

In addition, in the exemplary embodiment of the present disclosure, the way of determining the uplink transmission type by the UE may also be that the UE acquires other indication signaling and determines the transmission type of the uplink physical channel/uplink physical signal according to an association between the other indication signaling and the uplink transmission type. For example, the UE may first acquire a transmission type indication configured for a bandwidth portion, the transmission type of the uplink physical channel/physical signal of the scheduling may be determined according to the bandwidth portion where physical resources allocated to the physical channel/physical signal is.

After the uplink transmission type of the current scheduling is determined, the UE may determine a corresponding uplink power control parameter configuration scheme based on the uplink transmission type of the current scheduling.

Hereinafter, an operation of determining the uplink power control parameter configuration scheme at step 1910 will be described in detail in combination with embodiment 1 and embodiment 2.

In the embodiment 1 and embodiment 2 to be described below, the uplink power control parameter may be TPC command, and the uplink power control parameter configuration scheme may include at least one of a TPC command mode and a TPC command indication field definition. Further, the TPC command mode may include one of an accumulated TPC mode and an absolute TPC mode. The TPC command indication field definition may include at least one of the number of bits of TPC command indication field, and an association between the TPC command indication bit states and TPC commands.

Embodiment 1

According to embodiment 1, the UE may directly determine a corresponding uplink power control parameter configuration scheme based on the uplink transmission type of the current scheduling.

In the exemplary embodiment of the present disclosure, one of the ways for the UE to determine the uplink power control parameter configuration scheme may be acquiring the uplink power control parameter configuration scheme according to a predetermined association between the uplink transmission type and the uplink power control parameter configuration scheme.

Specifically, the UE may determine the TPC command mode of the uplink physical channel/physical signal to be used of the current scheduling according to a predetermined association between the uplink transmission type and the TPC command mode. For example, when the UE determines that the transmission type of the uplink physical channel/uplink physical signal of the current scheduling is the full-duplex transmission, the UE may determine that the TPC command mode of the uplink physical channel/uplink physical signal is the absolute TPC mode. When the UE determines that the transmission type of the uplink physical channel/uplink physical signal of the current scheduling is the non full-duplex transmission, the UE may determine that the TPC command mode of the uplink physical channel/uplink physical signal is the accumulated TPC mode, or, when the UE determines that the transmission type of the uplink physical channel/uplink physical signal of the current scheduling is the non full-duplex transmission, the UE may determine that the TPC command mode of the uplink physical channel/uplink physical signal is one of {the accumulated TPC mode, the absolute TPC mode} according to a higher layer signaling.

In addition, the UE may also determine the TPC command indication field definition to be used according to a predetermined association between the uplink transmission type and the TPC command indication field definition. For example, when the UE determines that the transmission type of the uplink physical channel/uplink physical signal of the current scheduling is the full-duplex transmission, the UE may acquire the TPC command indication field definition under the full-duplex transmission. When the UE determines that the transmission type of the uplink physical channel/uplink physical signal of the current scheduling is the non full-duplex transmission, the UE may acquire the TPC command indication field definition under the non full-duplex transmission.

In the exemplary embodiment of the present disclosure, when determining the TPC command indication field definition as above, the numbers of bits of the TPC command indication field under the full-duplex transmission and non full-duplex transmission may be the same, while the associations between the TPC command indication bit states and the TPC commands may be different depending on the uplink transmission type. For example, assuming that the number of bits of the TPC command indication field is 2 bits, the UE may determine that the TPC command indication field definition is {−3, 0, +1, +3}dB when determining that the transmission type of the uplink physical channel/uplink physical signal of the current scheduling is the full-duplex transmission (that is, the association between the TPC command indication bit states and the TPC commands is that the TPC commands corresponding to specific values of the TPC command indication bit states are {−3, 0, +1, +3}dB in sequence). The UE may determine that the TPC command indication field definition is {−1, 0, +1, +3}dB when determining that the transmission type of the uplink physical channel/uplink physical signal of the current scheduling is the non full-duplex transmission (that is, the association between the TPC command indication bit states and the TPC commands is that the TPC commands corresponding to specific values of the TPC command indication bit states are {−1, 0, +1, +3}dB in sequence). This method may expand the range of the TPC commands under the full-duplex transmission without increasing the signaling overhead, thereby ensuring that UEs operating in the full-duplex mode may be configured with appropriate operating points.

Further, in the exemplary embodiment of the present disclosure, when the TPC command indication field definition is determined as above, the numbers of bits of the TPC command indication field under the full-duplex transmission and non full-duplex transmission may also be different, and the associations between the TPC command indication bit states and the TPC commands may be different or not exactly the same depending on the uplink transmission type. For example, the UE may determine that the number of bits of the TPC command indication field is 3 bits and the TPC command indication field definition is {−8, −4, −3, −1, 0, +1, +3, +4}dB when determining that the transmission type of the uplink physical channel/uplink physical signal of the current scheduling is the full-duplex transmission (that is, the association between the TPC command indication bit states and the TPC commands is that the TPC commands corresponding to specific values of the TPC command indication bit states are {−8, −4, −3, −1, 0, +1, +3, +4}dB in sequence). The UE may determine that the number of bits of the TPC command indication field is 2 bits and the TPC command indication field definition is {−1, 0, +1, +3}dB when determining that the transmission type of the uplink physical channel/uplink physical signal of the current scheduling is the non full-duplex transmission (that is, the association between the TPC command indication bit states and the TPC commands is that the TPC commands corresponding to specific values of the TPC command indication bit states are {−1, 0, +1, +3} dB in sequence). This method may allow different uplink transmission types to have TPC command configurations with different granularities and/or ranges, thereby ensuring that UEs operating in the full-duplex mode may be configured with appropriate operating points.

In addition, in the exemplary embodiments of the present disclosure, another way to determine the uplink power control parameter configuration scheme according to the uplink transmission type of the current scheduling by the UE may be receiving a signaling indicating a corresponding uplink power control parameter configuration scheme under different transmission types, then the UE may determine the uplink power control parameter configuration scheme based on the signaling and the uplink transmission type.

Just as an example, a way to receive the signaling indicating the corresponding uplink power control parameter configuration scheme under different transmission types by the UE may be: the UE acquires that the TPC command mode of the uplink power control is one of {the accumulated TPC mode, the absolute TPC mode} when the UE performs the full-duplex transmission and/or non full-duplex transmission through user-specific higher layer signaling. In this way, the TPC command modes of the full-duplex transmission and the non full-duplex transmission mat be configured using different signaling, respectively; or, the TPC command modes of the full-duplex transmission and the non full-duplex transmission may be one TPC command mode configured using the same signaling and used for the two transmission types simultaneously; or, the TPC command modes of the full-duplex transmission and the non full-duplex transmission may be two TPC command modes jointly configured using one signaling and respectively used for the two transmission types. The UE then may determine the TPC command mode for power control of the uplink physical channel/uplink physical signal of the current scheduling according to the transmission type of the uplink physical channel/uplink physical signal of the current scheduling. Herein, the UE may determine the transmission type of the uplink physical channel/uplink physical signal of the current scheduling according to the aforementioned method of acquiring the uplink transmission type, which will be omitted here for brevity.

Embodiment 2

According to embodiment 2, the UE may determine the uplink power control parameter configuration scheme according to a change of the uplink transmission type to meet requirements of the full-duplex transmission and non full-duplex transmission.

Specifically, the UE may determine a corresponding uplink power control parameter configuration scheme according to a change between the transmission type of the uplink physical channel/uplink physical signal of the current scheduling and the transmission type of the uplink physical channel/physical signal of the last scheduling.

Just as an example, if the UE determines that the transmission type of the uplink physical channel/uplink physical signal of the current scheduling is the full-duplex transmission and the transmission type of the physical channel/physical signal of the last scheduling is the non full-duplex transmission, the UE may determine that the TPC command mode used for calculating the uplink transmit power of the uplink physical channel/uplink physical signal of the current scheduling is the absolute TPC mode; otherwise, the UE may acquire a specific TPC command mode (the absolute TPC or the accumulated TPC) used for calculating the uplink transmit power of the uplink physical channel/uplink physical signal of the current scheduling according to the indication of a higher layer signaling.

Just as another example, if the UE determines that the transmission type of the uplink physical channel/uplink physical signal of the current scheduling is different from the transmission type of the physical channel/physical signal of the last scheduling, the UE may determine that the TPC command mode used for calculating the uplink transmit power of the uplink physical channel/uplink physical signal of the current scheduling is the absolute TPC mode; otherwise, the UE may acquire a specific TPC command mode (the absolute TPC or the accumulated TPC) used for calculating the uplink transmit power of the uplink physical channel/uplink physical signal of the current scheduling according to indication of a higher layer signaling.

In the above two examples, according to the difference between the transmission types of the uplink physical channel/uplink physical signal of the current scheduling and the uplink physical channel/uplink physical signal of the last scheduling, the UE can determine different TPC command modes and can also determine different TPC command indication field definitions, i.e., different TPC command indication field definitions may be used in different conditions.

Just as an example, if the UE determines that the transmission type of the uplink physical channel/uplink physical signal of the current scheduling is the full-duplex transmission and the transmission type of the physical channel/physical signal of the last scheduling is the non full-duplex transmission, the UE may determine that the TPC command indication field definition used for calculating the uplink transmit power of the uplink physical channel/uplink physi-cal signal of the current scheduling is {−1, 0, +1, +3}dB; otherwise, the UE may acquire, according to the indication of a higher layer signaling, that the specific TPC command indication field definition used for calculating the uplink transmit power of the uplink physical channel/uplink physical signal of the current scheduling is {−1, 0, +1, +3} dB.

Just as another example, if the UE determines that the transmission type of the uplink physical channel/uplink physical signal of the current scheduling is different from the transmission type of the physical channel/physical signal of the last scheduling, the UE may determine that the TPC command indication field definition used for calculating the uplink transmit power of the uplink physical channel/uplink physical signal of the current scheduling is {−1, 0, +1, +3}dB; otherwise, the UE may determine, according to the indication of a higher layer signaling, that the specific TPC command indication field definition used for calculating the uplink transmit power of the uplink physical channel/uplink physical signal of the current scheduling is {−1, 0, +1, +3} dB.

In the above description regarding embodiment 2, the way to determine the TPC command mode and the TPC command indication field definition corresponding to the uplink transmission type is only an example, the present disclosure is not limited thereto. Various methods in embodiment 1 used for determining the TPC command mode and the TPC command indication field definition can also be similarly applied to embodiment 2. For example, the number of bits of the TPC command indication field and the TPC command indication field definition may also be determined variously according to whether the transmission type of the uplink physical channel/uplink physical signal of the current scheduling and the transmission type of the physical channel/physical signal of the last scheduling are the same.

As mentioned above, in the above various uplink power control parameter configuration schemes according to embodiment 1 and embodiment 2 of the present disclosure, various ways to determine the TPC command mode and the TPC command indication field definition to be used based on the uplink transmission type are described. However, it should be understood that the present disclosure is not limited thereto. When applying the exemplary embodiments of the present disclosure, one of the TPC command mode and the TPC command indication field definition may be determined based on the uplink transmission type as described above, while the other one may be determined according to traditional schemes, or both the TPC command mode and the TPC command indication field definition may be determined based on the uplink transmission type as described above.

At step 1920, the UE may acquire uplink power control parameters according to the uplink power control parameter configuration scheme determined at step 1910, and calculate uplink transmit power based on the acquired uplink power control parameters.

Specifically, after the TPC command mode and the TPC command indication field definition to be used are determined, the UE may acquire the TPC command by referring to the determined TPC command indication field definition (i.e., the determined association between the TPC command indication bit states and the TPC commands) according to the TPC command (i.e., TPC command indication bit states) in scheduling authorization information, and then calculate the uplink transmit power of the uplink physical channel/uplink physical signal of the current scheduling according to a calculation scheme corresponding to determined TPC command mode.

For example, when the UE determines that the transmission type of the uplink physical channel/uplink physical signal is the full-duplex transmission, and then determines that the TPC command mode is the absolute TPC mode according to a preset association between the uplink transmission type and the TPC command mode, it may calculate the uplink transmit power of the uplink physical channel/uplink physical signal according to the definition of the absolute TPC mode. When the UE determines that the transmission type of the uplink physical channel/uplink physical signal is the non full-duplex transmission, and then determines that the TPC command mode is the accumulated TPC mode according to the preset association between the uplink transmission type and the TPC command mode, it may calculate the uplink transmit power of the uplink physical channel/uplink physical signal according to the definition of the accumulated TPC mode, wherein a last power control adjustment state of the uplink physical channel/physical signal transmission based on which the uplink transmit power is calculated in the accumulated TPC mode is the last power control adjustment state for the non full-duplex transmission of the uplink physical channel/uplink physical signal.

Just as an example, when the TPC command mode corresponding to the non full-duplex transmission is the accumulated TPC mode, taking Physical Uplink Share Channel in 5G new radio technology as an example, the UE transmits Physical Uplink Share Channel on an uplink bandwidth part b of carrier f in serving cell c, and the uplink transmit power may be calculated depending on Expression (1):

$$P_{PUSCH b,f,c}(i, j, q_d, l) = \min \begin{cases} P_{CMAX,f,c}(i), \\ P_{O\_PUSCH b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{cases} \quad (1)$$

[dBm].

where j represents an index of related parameter configuration set, l represents an index of power control adjustment state of uplink share channel, and $f_{b,f,c}(i,l)$ represents a PUSCH power control adjustment state of the uplink share channel, for the definitions of the rest parameters, please refer to [3GPP TS 38.213: "NR; Physical layer procedures for control"].

To implement the exemplary embodiments of the present disclosure, in the above expression (1), when the accumulated TPC mode is turned on, the power control adjustment state of the uplink share channel may be $$f_{b,f,c}(i,l) = f_{b,f,c}(i_{last},l) + \delta_{PUSCH,b,f,c}(i_{last},i,K_{PUSCH},l) \quad (2)$$

In Expression (2) $\delta_{PUSCH,b,f,c}(i_{last},i,K_{PUSCH},l)$ represents TPC command, $f_{b,f,c}(i,l)$ represents the PUSCH power control adjustment state of PUSCH transmission timing i on the bandwidth part b of carrier f in serving cell c, $f_{b,f,c}(i_{last},l)$ represents the PUSCH power control adjustment state of PUSCH transmission timing $i_{last}$ on the bandwidth part b of carrier f in serving cell c, the PUSCH transmission timing $i_{last}$ is defined as the PUSCH transmission timing of the latest non full-duplexing, $K_{PUSCH}$ represents the number of time field symbols, for its specific definition and value, please see [3GPP TS 38.213: "NR; Physical layer procedures for control"].

The PUSCH power control adjustment state when the TPC command mode corresponding to the full-duplex transmission is the accumulated TPC mode may also be defined in a way similar to the above calculation method, and the corresponding uplink transmit power may be calculated.

Alternately, according to another example, the UE may also acquire a power adjustment state index value l of the uplink physical channel/uplink physical signal according to the uplink transmission type, thereby determining the corresponding TPC command. And similar to the aforementioned examples, the transmit power of the uplink share channel may also be calculated based on the aforementioned Expression (1).

Besides, the power control adjustment state value l of the uplink share channel may be defined as:

if the UE is provided with a corresponding higher layer signaling configuration, l∈{0,1,2,3}. If the UE does not have the corresponding higher layer signaling configuration or the uplink share channel is an uplink share channel carrying Msg3, l=0.

As for the uplink share channel transmission (including initial transmission and retransmission) provided with a higher layer parameter ConfiguredGrantConfig, when it is configured to the non full-duplex transmission, l=l', l∈{0,1}; when it is configured to the full-duplex transmission, l=2+l', l∈{2,3}, where l' is acquired by the UE according to the higher layer parameter powerControl-LoopToUse.

If the UE is provided with a higher layer parameter SRI-PUSCH-PowerControl, it will acquire an association between indicator set of a probe reference signal resource indication field in downlink control information and values of l' provided by a higher layer signaling sri-PUSCH-ClosedLoopIndex. If the downlink control information for scheduling the uplink share channel includes the probe reference signal resource indication field, the UE will acquire l' according to the values of the probe reference signal resource indication field. In this case, when the UE is configured to perform non full-duplex transmission, l=l'; When the UE is configured to perform full-duplex transmission, l=L+l', where L is a maximum value that may be configured for l'

If the downlink control information for scheduling the uplink share channel does not include the probe reference signal resource indication field, or if the higher layer parameter SRI-PUSCH-PowerControl is not provided to the user, when the UE is configured to the non full-duplex transmission, l=0; and when the UE is configured to the full-duplex transmission, l=2.

The method of calculating the uplink transmit power when the TPC command mode is the accumulated TPC mode is described above. However, it should be understood that this is only an example for easy understanding, and the present application is not limited thereto. In an exemplary embodiment of the present disclosure, for a TPC command mode determined according to any of the foregoing methods, when the TPC command mode is the absolute TPC mode, the uplink transmit power may be calculated according to a method related to the absolute TPC mode in the prior art, and when the TPC command mode is the accumulated TPC mode, the uplink transmit power may be calculated according to the method related to the accumulated TPC mode in the prior art or the above specific calculation method of the present application.

Preferably, in the exemplary embodiments of the present disclosure, the UE may also determine the power control adjustment state (i.e. $f_{b,f,c}(i_{last},1)$) of the uplink physical channel/uplink physical signal of the last scheduling based on which the uplink transmit power is calculated according to the transmission type of the uplink physical channel/uplink physical signal of the current scheduling determined at step 1510 and the corresponding TPC command mode, and put the power control adjustment state into Expression (1) to calculate the uplink physical power. For example, assuming that the transmission type of the uplink physical channel/uplink physical signal of the current scheduling of the UE is the full-duplex transmission, and the corresponding TPC command mode is the accumulated TPC mode, the power control adjustment state of the uplink physical channel/uplink physical signal of the last scheduling based on which the UE calculates the uplink transmit power is the power control adjustment state for the last full-duplex transmission of the uplink physical channel/physical signal. Likewise, assuming that the transmission type of the uplink physical channel/uplink physical signal of the current scheduling of the UE is the non full-duplex transmission, and the corresponding TPC command mode is the accumulated TPC mode, the power control adjustment state of the uplink physical channel/uplink physical signal of the last scheduling based on which the UE calculates the uplink transmit power is the power control adjustment state for the last non full-duplex transmission of the uplink physical channel/physical signal. Thus, the UE may calculate the power control adjustment states for different uplink transmission types, respectively, thereby calculating the uplink transmit power for different uplink transmission types, respectively.

The method of calculating the uplink transmit power when the uplink power control parameter is the TPC command and the uplink power control parameter configuration scheme is at least one of the TPC command mode and the TPC command indication field definition is described above with reference to the embodiment 1 and embodiment 2. However, the present disclosure is not limited thereto. The uplink power control parameter may also be a power offset to be added to the uplink transmit power or the target receive power, and the uplink power control parameter configuration scheme may be a power shifting scheme, which will be described in conjunction with embodiment 3 below.

Embodiment 3

According to embodiment 3, the UE may determine an uplink transmission type of current scheduling at step 1910, and determine whether to use the power shifting scheme based on the uplink transmission type of the current scheduling. Specifically, when the uplink transmission type of the current scheduling is the full-duplex transmission, it may be determined to use the power shifting scheme, that is, adding a power offset to the uplink transmit power or the target receive power when the uplink transmission type of the current scheduling is a full-duplex transmission; otherwise, no power offset will be added to the uplink transmit power or the target receive power. The method of determining the uplink transmission type has been described above, which will be omitted here for brevity.

Then, the UE can determine a power offset depending on the determined power shifting scheme at step 1920.

Specifically, the uplink transmit power of the uplink physical channel/uplink physical signal under the full-duplex transmission may be the uplink transmit power of the uplink physical channel/uplink physical signal under the non full-duplex transmission added with a power offset, or the target receive power of the uplink physical channel/uplink physical signal under the full-duplex transmission may be the target receive power of the uplink physical channel/uplink physical signal under the non full-duplex transmission added with a power offset.

Just as an example, an example that the target receive power of the uplink physical channel/uplink physical signal under the full-duplex transmission is the target receive power of the uplink physical channel/uplink physical signal under the non full-duplex transmission added with a power offset will be explained in detail.

Still taking the uplink share channel in the 5G new radio technology of the prior art as an example, the specific definition of the target receive power is the first item $P_{o\_PUSCHb,f,c}(j)$ in the foregoing transmit power calculation expression (1). The target receive power $P_{o\_PUSCHb,f,c}(j)$ is obtained by summing one or more target power values acquired by a user according to the higher layer signaling, j represents different power control scenarios, for example, j=0 represents a power control for a random access process and so on (for the details, please refer to [3GPP TS 38.213: "NR; Physical layer procedures for control"]).

The UE may obtain different target receive power according to the transmission type of uplink physical channel/uplink physical signal or the indication related to the transmission type. Specifically, the target receive power of the uplink physical channel/uplink physical signal under the full-duplex transmission is the target receive power of the uplink physical channel/uplink physical signal under the non full-duplex transmission added with a power offset, For example, in the power calculation of the uplink share channel, $P_{O\_PUSCHb,f,c}(j,i_{dup})$ is defined as the target receive power of the uplink share channel and is consisted of a sum of $P_{O\_NOMINAL\_PUSCH,f,c}(j,i_{dup})$ and $P_{O\_UE\_PUSCH,b,f,c}(j,i_{dup})$, $j \in \{0, 1, \ldots, J-1\}$, and index values of $i_{dup}$ are obtained by the UE through the higher layer signaling or obtained by the UE according to a judgment about whether the transmission type of the uplink share channel is the non-dull duplex transmission, $i_{dup}=0$ indicates the non full-duplex transmission, and $i_{dup}=1$ indicates the full-duplex transmission.

When $i_{dup}=0$, the way to calculate $P_{o\_PUSCHb,f,c}(j,0)$ is still the same as that in the prior art, wherein acquisitions of each component, i.e., $P_{O\_NOMINAL\_PUSCH,f,c}(j,0)$ and $P_{O\_UE\_PUSCH,b,f,c}(j,0)$, may refer to the related description in [3GPP TS 38.213: "NR; Physical layer procedures for control"].

When $i_{dup}=1$, the way to calculate $P_{O\_PUSCHb,f,c}(j,1)$ is still the same as that in the prior art, wherein the component $P_{O\_NOMINAL\_PUSCH,f,c}(j,1)=P_{O\_NOMINAL\_PUSCH,f,c}(j,0)$, its acquisition may refer to the related description in [3GPP TS 38.213: "NR; Physical layer procedures for control"], while $P_{O\_UE\_PUSCH,b,f,c}(j,1)=P_{O\_UE\_PUSCH,b,f,c}(j,0)+\Delta_{FD}$. The acquisition of $P_{O\_UE\_PUSCH,b,f,c}(j,0)$ may refer to the related description in [3GPP TS 38.213: "NR; Physical layer procedures for control"], $\Delta_{FD}=\Delta_{FD\_cell}+\Delta_{FD\_UE}$ is power offset between the uplink share channel under the full-duplex transmission and the uplink share channel under the non full-duplex transmission, wherein $\Delta_{FD\_cell}$ may be obtained by the UE according to the higher layer signaling or be a preset value, the higher layer signaling provided with $\Delta_{FD\_cell}$ may be a cell-specific higher layer signaling, which is used to provide a target power offset when all the users in the cell perform the full-duplex transmission of the uplink share channel. $\Delta_{FD\_cell}$ may be used to compensate for the reduction of the uplink reception SNR caused by the self-interference on the base station operating in the full-duplex mode.

$\Delta_{FD\_UE}$ may be obtained by the UE according to the higher layer signaling or be a preset value, the higher layer signaling provided with $\Delta_{FD\_UE}$ may be a user- or user group-specific higher layer signaling, which is used to provide a target power offset when a single user or a group of users perform the full-duplex transmission of the uplink share channel. $\Delta_{FD\_UE}$ may be used to reduce the transmit power of the UE when the UE operates in the full-duplex mode so that the self-interference in user side meets the reception SNR requirements.

It should be understood that the above description is only example, the present disclosure is not limited thereto, and the power offset $\Delta_{FD}$ may also include only one of $\Delta_{FD\_cell}$ and $\Delta_{FD\_UE}$, that is, $\Delta_{FD}=\Delta_{FD\_cell}$ or $\Delta_{FD}=\Delta_{FD\_UE}$.

In addition, $\Delta_{FD}$ may also be a power offset added on the uplink transmit power of the uplink physical channel/physical signal under the non full-duplex transmission. The specific calculating method is the same as the method described above, and will not be described in detail for the sake of simplicity.

The example of implementing the power control method according to the exemplary embodiments of the present disclosure by a UE has been described in detail above with reference to FIG. 19, however, the power control method according to the exemplary embodiments of the present disclosure is cooperatively implemented by the UE and the base station. FIG. 20 describes the operations of parameter configuration for power control on the base station side.

FIG. 20 is a flowchart illustrating a parameter configuration method for power control according to an exemplary embodiment of the present disclosure.

Referring to FIG. 20, a base station may configure parameters related to an uplink power control parameter configuration scheme to be used by a UE device at step 2010.

Then, the base station may transmit the parameters to the UE so that the UE is able to determine the uplink power control parameter configuration scheme by using the parameters based on an uplink transmission type of current scheduling at step 2020.

In an exemplary embodiment of the present disclosure, the parameters related to an uplink power control parameter configuration scheme to be used by the UE may be associated with the uplink transmission type. Just as an example, when the UE may determine the uplink power control parameter configuration scheme based on a predetermined association between the uplink transmission type and the uplink power control parameter configuration scheme, since the predetermined association is already known to the UE, the base station may configure the uplink transmission type of the current scheduling to the parameters related the uplink power control parameter configuration scheme. As yet another example, the base station may also configure specific uplink power control parameter configuration schemes under different transmission types and the uplink transmission type of the current scheduling as parameters related to the uplink power control parameter configuration scheme, so that the UE can determine the specific uplink power control parameter configuration scheme to be used according to the uplink transmission type of the current scheduling.

In addition, the base station may also use the TPC indication bits as a parameter related to the uplink power control parameter configuration scheme, so that the UE can determine the TPC command indication field definition to be used according to information such as the uplink transmission type of the current scheduling, the number of TPC indication bits and the like.

Further, the base station may also directly configure the specific uplink power control parameter configuration scheme as a parameter related to the uplink power control parameter configuration scheme. For example, the base station may use, for example, 1-bit signaling to indicate to the UE that the TPC command mode of the uplink physical channel/uplink physical signal of the current scheduling is one of the accumulated TPC mode and the absolute TPC mode, and then the command may be transmitted to the UE through the scheduling authorization information and read by the UE, thereby determining the TPC command mode.

It should be understood that the above illustrated parameters related to the uplink power control parameter configuration scheme and transmitted to the UE by the base station are only examples, the present application is not limited thereto. Various parameters obtained from the base station by the UE using different manners or signaling, mentioned in the illustration of FIG. 19, may be used as the parameters related the uplink power control parameter configuration scheme according to a specific design, which will not be described in detail for simplicity.

FIG. 21 is a block diagram illustrating a UE 2100 according to an exemplary embodiment of the present disclosure.

Referring to FIG. 21, the UE 700 according to an exemplary embodiment of the present disclosure includes a control scheme determining unit 2110 and a transmit power calculating unit 2120.

The control scheme determining unit 2110 may determine an uplink transmission type of current scheduling, and determine an uplink power control parameter configuration scheme based on the uplink transmission type of the current scheduling. Specifically, the control scheme determining unit 2110 may acquire a signaling indication on a transmission type of uplink physical channel or uplink physical signal from the base station to determine the uplink transmission type; or, the control scheme determining unit 2110 may acquire a predetermined indication command from the base station, and determine the uplink transmission type according to an association between the predetermined indication command and the uplink transmission type.

In an exemplary embodiment of the present disclosure, the uplink power control parameter may be a TPC command, and the uplink power control parameter configuration scheme may include at least one of a TPC command mode and a TPC command indication field definition. The TPC command mode may include one of an accumulated TPC mode and an absolute TPC mode. The TPC command indication field definition may include at least one of the number of bits of the TPC command indication field, and an association between the TPC command indication bit states and the TPC commands.

The control scheme determining unit 2110 may determine the uplink power control parameter configuration scheme based on a predetermined association between the uplink transmission type and the uplink power control parameter configuration scheme. Specifically, the control scheme determining unit 2110 may determine the TPC command indication field definition and/or TPC command mode to be used based on the predetermined association between the uplink transmission type and the TPC command indication field definition. In the case where the TPC command indication field is determined, for different uplink transmission types, the numbers of the bits of the TPC command indication field may be the same, and the associations between the TPC command indication bit states and the TPC commands may be different; or, for different uplink transmission types, the numbers of bits of the TPC command indication field and the associations between the TPC command indication bit states and TPC commands may be different.

Further, the control scheme determining unit 2110 may also receive a signaling indicating a corresponding uplink power control parameter configuration scheme under different uplink transmission types from the base station, and determine the uplink power control parameter configuration scheme based on the signaling and the uplink transmission type.

In addition, the control scheme determining unit 2110 may also determine the corresponding uplink power control parameter configuration scheme based on the uplink transmission type of the current scheduling and the uplink transmission type of the previous scheduling.

The transmit power calculating unit 2120 may acquire uplink power control parameters according to the uplink power control parameter configuration scheme determined by the control scheme determining unit 2110, and calculate uplink transmit power based on the acquired uplink power control parameters. In the exemplary embodiments of the present disclosure, the transmit power calculating unit 2120 may determine the corresponding TPC command based on a value of the TPC command indication bits by referring to the association between the TPC command indication bit states and the TPC commands, and calculate the uplink transmit power using the determined TPC command.

Moreover, in another exemplary embodiment of the present disclosure, the uplink power control parameter configuration scheme may be a power shifting scheme, and the uplink power control parameters may include a power offset to be added to the uplink transmit power or target receive power. In this case, the control scheme determining unit 2110 may determine to use the power shifting scheme when the uplink transmission type of the current scheduling is the full-duplex transmission, that is, adding a power offset to the uplink transmit power or the target receive power when the uplink transmission type of the current scheduling is a full-duplex transmission; otherwise, no power offset will be added to the uplink transmit power or the target receive power. The transmit power calculating unit 2120 may calculate the uplink transmit power based on the corresponding power offset value.

The details of the operations performed by the control scheme determining unit 2110 and the transmit power calculating unit 2120 have been described in detail above in connection with steps and operations of FIG. 19, which will be omitted here for brevity.

FIG. 22 is a block diagram illustrating a base station 2200 according to an exemplary embodiment of the present disclosure.

Referring to FIG. 22, the base station 2200 according to an exemplary embodiment of the present disclosure includes a parameter configuring unit 2210 and a transmitting unit 2220.

The parameter configuring unit 2210 may configure parameters related to the uplink power control parameter configuration scheme to be used by the UE, and these parameters are associated with the uplink transmission type.

Then the transmitting unit 2220 transmits these parameters to the UE so that the UE is able to determine the uplink power control parameter configuration scheme by using these parameters based on the uplink transmission type of the current scheduling, and calculate the uplink transmit power.

The details of the operations performed by the parameter configuring unit 2210 and the transmitting unit 2220 have been described in detail above in connection with operations of FIGS. 5-8, which will be omitted here for brevity.

According to the exemplary embodiments of the present disclosure, the various power control methods and parameter configuration methods described above can be applied to a wireless communication system including a base station and a UE, so that when the scheduling result for the UE may switches between the full-duplex transmission and the half-duplex transmission, it is possible to adapt to the power adjustment requirements of different transmission types. Moreover, it should be understood that the exemplary embodiments described in this description are merely examples shown for ease understanding, and the present application is not limited thereto. Any equivalent, alternative, and modification of the present disclosure may be considered to fall within the scope of the invention without departing from the spirit and scope of the present disclosure.

The exemplary embodiments of the present disclosure can also be implemented as computer-readable codes on a computer-readable recording medium. The computer readable recording medium is any data storage device that can store data read by a computer system. Examples of the computer readable recording medium include a read-only memory (ROM), a random access memory (RAM), a CD-ROM, a storage tape, a floppy disk, an optical data storage device and a carrier (such as data transmission over an Internet via a wired or wireless transmission path). The computer-readable recording medium may also be distributed on a computer system connected to a network, so that the computer-readable code may be stored and executed in a distributed manner. In addition, functional programs, codes, and code segments that accomplish the present disclosure can be easily interpreted by ordinary programmers in the fields related to the present disclosure within the scope of the present disclosure.

In addition, it should be understood that the respective units in the terminal and the base station in accordance with the exemplary embodiments of the present disclosure can be implemented as a hardware component and/or a software component. Those skilled in the art may, for example, use a field programmable gate array (FPGA) or an application specific integrated circuit (ASIC) to implement the respective units according to the procedure performed by the unit.

In addition, the method according to the exemplary embodiments of the present disclosure may be implemented as a computer code in a computer readable recording medium. Those skilled in the art may implement the computer code according to the description for the above method. The above method of the present disclosure is implemented when the computer code is executed in a computer.

Although some exemplary embodiments of the present disclosure have been shown and described, it should be understood by those skilled in the art that amendments can be made to those exemplary embodiments without departing from the principle and spirit of the present disclosure of which the scope is defined in the claims and the equivalents thereof.

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

INDUSTRIAL APPLICABILITY

Various embodiments of the present application can be used for wireless communication.

The invention claimed is:

1. A data transmission method performed by a terminal, comprising:
   obtaining configuration information for uplink or downlink data transmission;
   determining whether a front loaded reference signal is transmitted according to the obtained configuration information;
   in response to determining that the front loaded reference signal is transmitted, transmitting the front loaded reference signal using a first subframe structure in which at least one time domain symbol for transmitting the front loaded reference signal is comprised; and
   in response to determining that the front loaded reference signal is not transmitted, performing the uplink data transmission or the downlink data reception,
   wherein, in case that the front loaded reference signal is transmitted before the data transmission, the at least one time domain symbol is previous to time domain symbols used by the uplink or downlink data transmission, and
   wherein, in case that the front loaded reference signal is transmitted when the data transmission starts, the at least one time domain symbol is first several time domain symbols used by the uplink or downlink data transmission.

2. The method of claim 1, wherein the determining whether the front loaded reference signal is transmitted comprises:
   determining whether the front loaded reference signal is transmitted according to indication information in uplink or downlink scheduling grant information or uplink or downlink semi-persistent scheduling configuration information included in the configuration information; or
   determining whether the front loaded reference signal is transmitted according to information related to a physical resource for the uplink or downlink data transmission acquired through the uplink or downlink scheduling grant information or the uplink or downlink semi-persistent scheduling configuration information.

3. The method of claim 1,
   wherein the transmitting of the front loaded reference signal comprises:
      obtaining configuration information of the front loaded reference signal, and
      transmitting the front loaded reference signal according to the configuration information of the front loaded reference signal,
      wherein the configuration information of the front loaded reference signal comprises at least one of: a sequence of transmitting the front loaded reference signal, the number of time domain symbol used for transmitting the front loaded reference signal or an index of the time domain symbol used for transmitting the front loaded reference signal, a reference signal pattern, a bandwidth for transmitting the front loaded reference signal, and transmit power of the front loaded reference signal.

4. The method of claim 1, wherein in case that the front loaded reference signal is transmitted when the data transmission starts, at least one physical resource element for transmitting the front loaded reference signal and at least one physical resource element for the data transmission are the at least one physical resource element of different subcarriers on a domain symbol when the data transmission starts, or the at least one physical resource element for transmitting the front loaded reference signal and the at least one physical resource element for the data transmission are the same physical resource element.

5. The method of claim 1,
   further comprising:
   transmitting uplink control information using the first subframe structure,
   wherein a starting time domain symbol for transmitting the uplink control information is not earlier than a last time domain symbol for transmitting the front loaded reference signal, and
   wherein the uplink control information at least comprises essential information for grant-free transmission of uplink or downlink shared channel.

6. The method of claim 1,
   wherein timing advance for transmitting the front loaded reference signal and timing advance for transmitting the uplink data are different,
   wherein when the timing advance for transmitting the front loaded reference signal is less than the timing advance for transmitting the uplink data and the time domain symbol for transmitting the front loaded reference signal and the time domain symbol for transmitting the uplink data are adjacent to each other, time domain signals before a time domain termination location at which the front loaded reference signal is transmitted, among time domain signals of the uplink data are not transmitted while the uplink data transmission is performed, or the time domain signal after a time domain starting location of the uplink data, among time domain signals of the front loaded reference signal is not transmitted while the front loaded reference signal is transmitted.

7. A terminal for performing data transmission, the terminal comprising:
   a transceiver configured to transmit and receive a signal; and
   at least one processor configured to:
      obtain configuration information for uplink or downlink data transmission,
      determine whether a front loaded reference signal is transmitted according to the obtained configuration information,
      in response to determining that the reference signal is transmitted, transmit, via the transceiver, the front loaded reference signal using a first subframe structure in which at least one time domain symbol for transmitting the front loaded reference signal is comprised, and
      in response to determining that the front loaded reference signal is not transmitted, perform the uplink data transmission or the downlink data reception, wherein, in case that the front loaded reference signal is transmitted before the data transmission, the at least one time domain symbol is previous to time domain symbols used by the uplink or downlink data transmission, and wherein, in case that the front loaded reference signal is transmitted when the data transmission starts, the at least one time domain symbol is first several time domain symbols used by the uplink or downlink data transmission.

8. The terminal of claim 7, wherein the at least one processor is further configured to:

determine whether the front loaded reference signal is transmitted according to indication information in uplink or downlink scheduling grant information or uplink or downlink semi-persistent scheduling configuration information included in the configuration information, or determine whether the front loaded reference signal is transmitted according to information related to a physical resource for the uplink or downlink data transmission acquired through the uplink or downlink scheduling grant information or the uplink or downlink semi-persistent scheduling configuration information.

9. The terminal of claim 7, wherein the at least one processor is further configured to:

obtain configuration information of the front loaded reference signal, and transmit, via the transceiver, the front loaded reference signal according to the configuration information of the front loaded reference signal, wherein the configuration information of the front loaded reference signal comprises at least one of: a sequence of transmitting the front loaded reference signal, the number of time domain symbol used for transmitting the front loaded reference signal or an index of the time domain symbol used for transmitting the front loaded reference signal, a reference signal pattern, a bandwidth for transmitting the front loaded reference signal, and transmit power of the front loaded reference signal.

10. The terminal of claim 7, wherein in case that the front loaded reference signal is transmitted when the data transmission starts, at least one physical resource element for transmitting the front loaded reference signal and at least one physical resource element for the data transmission are the at least one physical resource element of different subcarriers on a domain symbol when the data transmission starts, or the at least one physical resource element for transmitting the front loaded reference signal and the at least one physical resource element for the data transmission are the same physical resource element.

11. The terminal of claim 7, wherein the at least one processor is further configured to:

transmit, via the transceiver, uplink control information using the first subframe structure, wherein a starting time domain symbol for transmitting the uplink control information is not earlier than a last time domain symbol for transmitting the front loaded reference signal, and wherein the uplink control information at least comprises essential information for grant-free transmission of uplink or downlink shared channel.

12. The terminal of claim 7, wherein timing advance for transmitting the front loaded reference signal and timing advance for transmitting the uplink data are different, and wherein when the timing advance for transmitting the front loaded reference signal is less than the timing advance for transmitting the uplink data and the time domain symbol for transmitting the front loaded reference signal and the time domain symbol for transmitting the uplink data are adjacent to each other, time domain signals before a time domain termination location at which the front loaded reference signal is transmitted, among time domain signals of the uplink data are not transmitted while the uplink data transmission is performed, or the time domain signal after a time domain starting location of the uplink data, among time domain signals of the front loaded reference signal is not transmitted while the front loaded reference signal is transmitted.

* * * * *